United States Patent
Lamoureux et al.

(10) Patent No.: US 11,892,054 B2
(45) Date of Patent: *Feb. 6, 2024

(54) POSITION-RELATIVE DAMPER ASSIST SYSTEM

(71) Applicants: Elka Suspension Inc., Boucherville (CA); Horstman Systems Inc., Woodbridge (CA)

(72) Inventors: Martin Lamoureux, Saint-Basile-le-Grand (CA); Pierre-Yves Deneault, Contrecoeur (CA); Claude Porlier, North York (CA); Daniel Van Hee, Brampton (CA)

(73) Assignees: Horstman Systems Inc.; Elka Suspension Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/323,239

(22) Filed: May 18, 2021

(65) Prior Publication Data
US 2021/0270341 A1 Sep. 2, 2021

Related U.S. Application Data

(63) Continuation of application No. 16/319,548, filed as application No. PCT/CA2017/050878 on Jul. 20, 2017, now Pat. No. 11,009,096.
(Continued)

(51) Int. Cl.
*F16F 9/34* (2006.01)
*F16F 9/48* (2006.01)

(52) U.S. Cl.
CPC .......... *F16F 9/3405* (2013.01); *F16F 9/486* (2013.01)

(58) Field of Classification Search
CPC ........ F16F 9/3405; F16F 9/3481; F16F 9/486; F16F 9/5126
See application file for complete search history.

(56) References Cited

U.S. PATENT DOCUMENTS

| | | | |
|---|---|---|---|
| 1,628,811 A | 5/1927 | Shultz et al. | |
| 1,957,997 A | 5/1934 | Fieldman | |

(Continued)

FOREIGN PATENT DOCUMENTS

| | | | |
|---|---|---|---|
| DE | 1480194 A1 | 3/1970 | |
| EP | 1085233 A2 | 3/2001 | |

(Continued)

*Primary Examiner* — Pamela Rodriguez
(74) *Attorney, Agent, or Firm* — Price Heneveld LLP

(57) ABSTRACT

A position-relative damper assist system (1) for use with a vehicle, the position-relative damper assist system (1) comprising top and bottom mounting components (5,3), a piston assembly (9), an adjustment assembly (19), and a biasing assembly (21). The piston assembly (9) is operatively disposed between the top and bottom mounting components (5,3), and has a piston head (11) being displaceable within a chamber (13), and being provided with at least one fluid passage (15) for allowing fluid (17) of the chamber (13) to travel therethrough, in order to provide a corresponding damping effect. The adjustment assembly (19) cooperates with the piston head (11) of the piston assembly (9) for adjustably varying an effective cross-sectional profile of the at least one fluid passage (15) in order to in turn vary a corresponding flow rate of fluid (17) passing through said at least one fluid passage (15), and in turn vary the resulting damping effect. The biasing assembly (21) cooperates with the adjustment assembly (19) for selectively varying a configuration of the adjustment assembly (19) in response to a given input indicative of the positioning of the piston assembly (9) within a stroke distance (7), in order in vary the resulting damping effect in response to a corresponding (Continued)

displacement-profile (23) provided by the biasing assembly (21).

19 Claims, 15 Drawing Sheets

Related U.S. Application Data

(60) Provisional application No. 62/364,545, filed on Jul. 20, 2016.

(56) References Cited

U.S. PATENT DOCUMENTS

| | | | |
|---|---|---|---|
| 2,009,678 A | 7/1935 | Pennington | |
| 3,032,145 A | 5/1962 | Katz | |
| 4,061,295 A | 12/1977 | Somm | |
| 4,153,237 A | 5/1979 | Supalla | |
| 4,624,346 A | 11/1986 | Katz | |
| 4,773,514 A | 9/1988 | Gustafsson | |
| 4,798,398 A | 1/1989 | Cummins | |
| 5,044,614 A | 9/1991 | Rau | |
| 5,102,109 A | 4/1992 | Schnetz | |
| 5,516,133 A | 5/1996 | Montrenec et al. | |
| 5,810,128 A | 9/1998 | Eriksson et al. | |
| 5,862,895 A | 1/1999 | Ricard | |
| 6,296,092 B1 | 10/2001 | Marking et al. | |
| 6,382,370 B1 | 5/2002 | Girvin | |
| 6,401,884 B2 | 6/2002 | Norman et al. | |
| 6,415,895 B2 | 7/2002 | Marking et al. | |
| 6,880,684 B1 | 4/2005 | Vans et al. | |
| 6,966,412 B2 | 11/2005 | Braswell et al. | |
| 7,128,192 B2 | 10/2006 | Fox | |
| 7,273,137 B2 | 9/2007 | Fox | |
| 7,374,028 B2 | 5/2008 | Fox | |
| 7,556,130 B2 | 7/2009 | Lamoureux et al. | |
| 7,628,259 B2 | 12/2009 | Norgaard et al. | |
| 7,690,666 B2 | 4/2010 | McAndrews | |
| 8,764,029 B2 | 7/2014 | Venton-Walters et al. | |
| 8,807,299 B2 | 8/2014 | Gagnon et al. | |
| 9,573,435 B2 | 2/2017 | Lamoureux et al. | |
| 11,009,096 B2 * | 5/2021 | Lamoureux | F16F 9/3405 |
| 2009/0277734 A1 | 11/2009 | Cox et al. | |
| 2010/0059321 A1 | 3/2010 | Boivin | |
| 2010/0170760 A1 | 7/2010 | Marking | |
| 2011/0214956 A1 | 9/2011 | Marking | |
| 2011/0315494 A1 | 12/2011 | Marking | |
| 2012/0018263 A1 | 1/2012 | Marking | |
| 2012/0048665 A1 | 3/2012 | Marking | |
| 2012/0222927 A1 | 9/2012 | Marking | |
| 2012/0305350 A1 | 12/2012 | Ericksen et al. | |
| 2013/0228404 A1 | 9/2013 | Marking | |
| 2013/0292218 A1 | 11/2013 | Ericksen et al. | |
| 2014/0008160 A1 | 1/2014 | Marking | |
| 2014/0124312 A1 | 5/2014 | Marking | |

FOREIGN PATENT DOCUMENTS

| | | |
|---|---|---|
| EP | 1754909 A1 | 2/2007 |
| EP | 2116739 A2 | 11/2009 |
| EP | 2402626 A2 | 1/2012 |
| EP | 2410203 A2 | 1/2012 |
| EP | 2495472 A2 | 9/2012 |
| EP | 2530355 A2 | 12/2012 |
| GB | 1021358 | 3/1966 |
| GB | 2170294 A | 7/1986 |
| WO | 0079148 A2 | 12/2000 |
| WO | 02101262 A1 | 12/2002 |
| WO | 2008086605 A1 | 7/2008 |
| WO | 2012112076 A1 | 8/2012 |

* cited by examiner

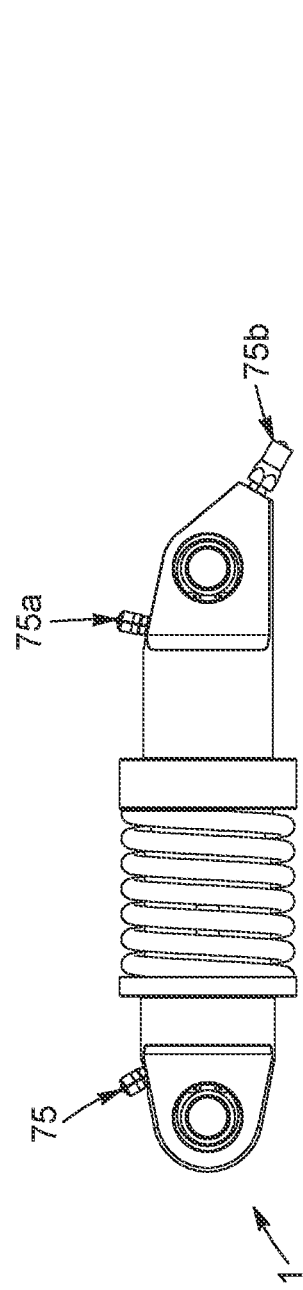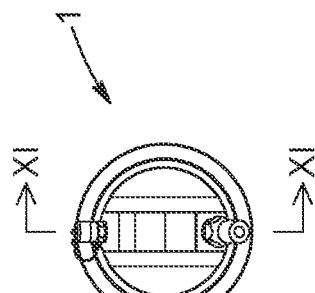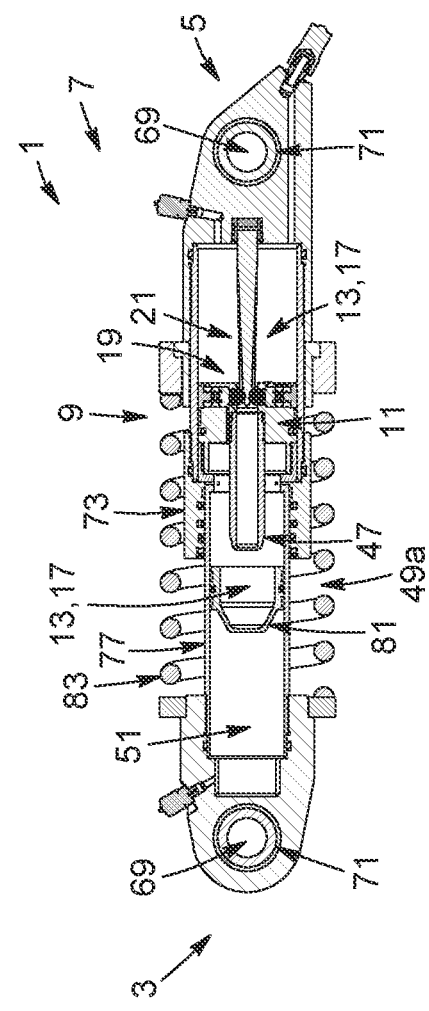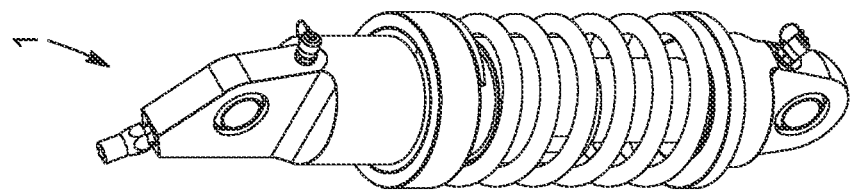

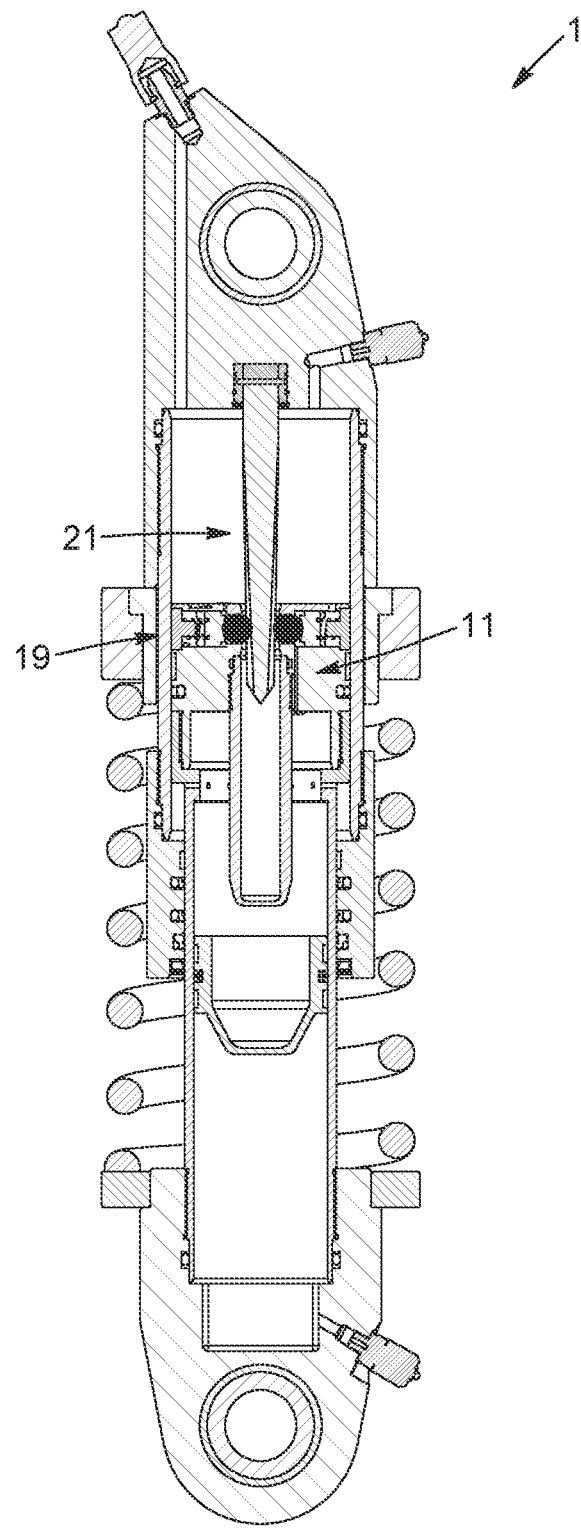
FIG. 7 (MID STROKE)

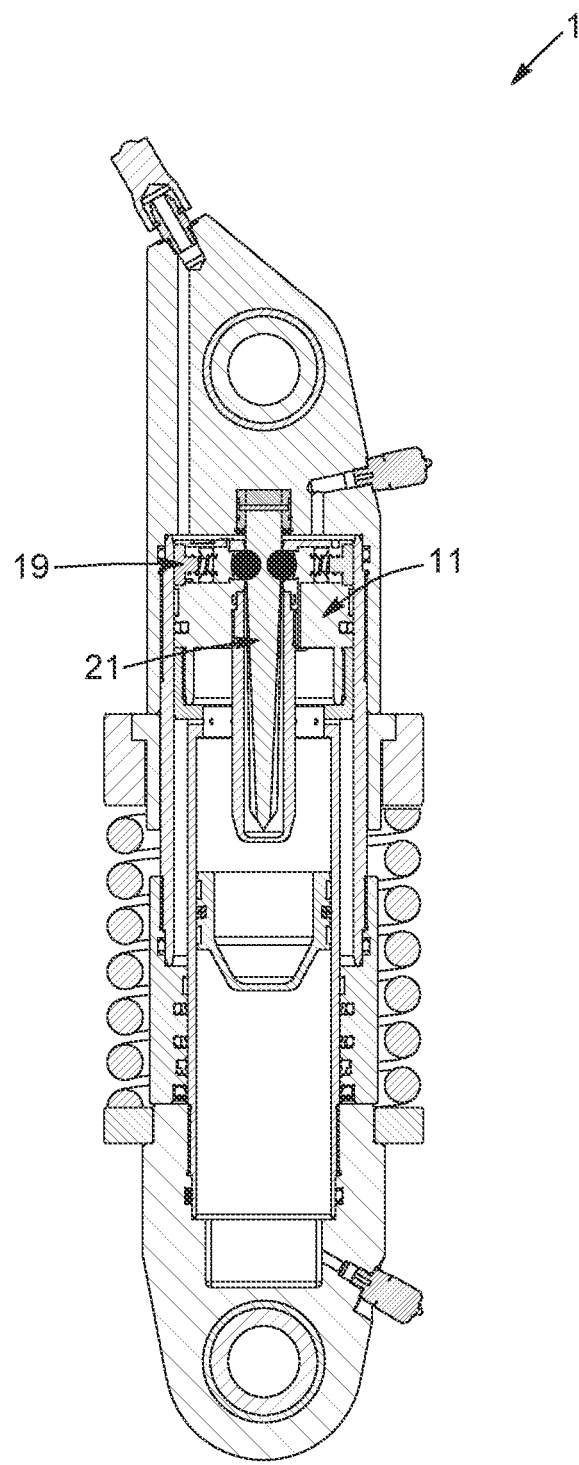
FIG. 8 (FULL COMPRESSION)

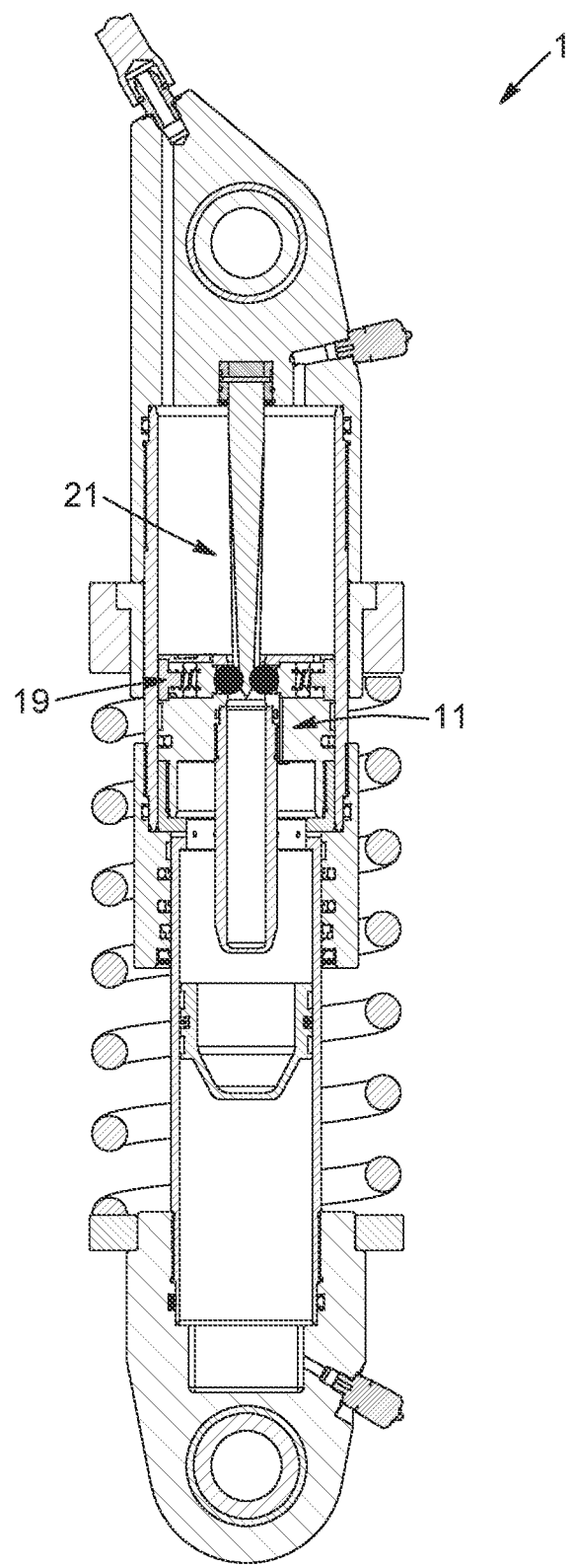
FIG. 9 (FULL REBOUND)

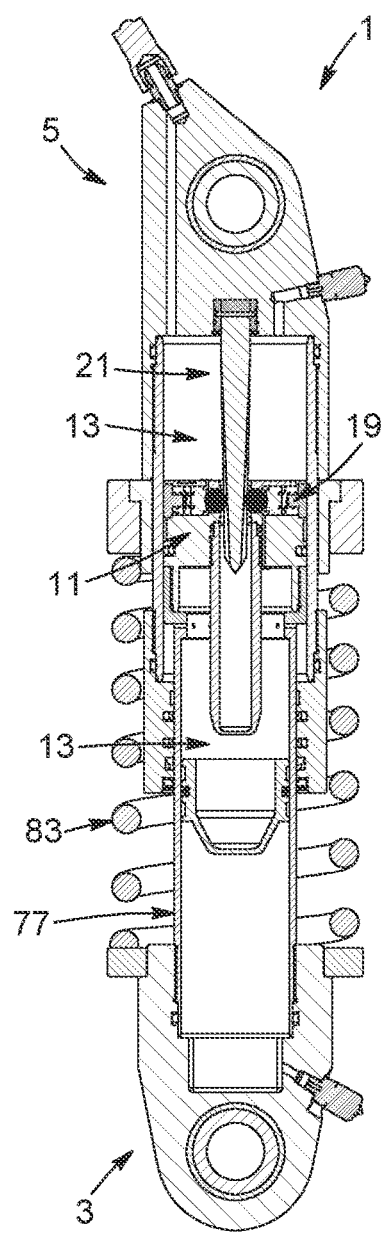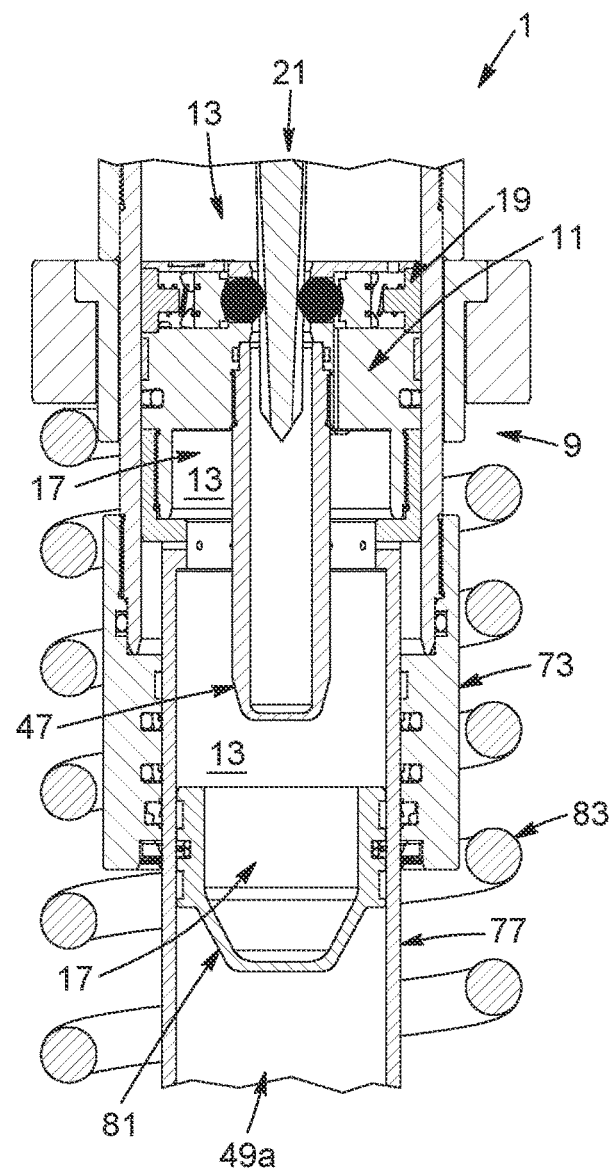
FIG. 10
FIG. 11

POSITION-RELATIVE DAMPER ASSIST SYSTEM

CROSS-REFERENCE TO RELATED APPLICATIONS

The present patent application is a continuation of U.S. patent application Ser. No. 16/319,548 filed on Jan. 22, 2019 (now U.S. Pat. No. 11,009,096), entitled "POSITION-RELATIVE DAMPER ASSIST SYSTEM," which is a 371 national stage entry of International Patent Application No. PCT/CA2017/050878 filed on Jul. 20, 2017, which claims the benefit of priority of U.S. Patent Provisional Application No. 62/364,545, entitled "POSITION-RELATIVE DAMPER ASSIST SYSTEM," filed on Jul. 20, 2016.

FIELD OF THE INVENTION

The present invention relates to the field of shock-absorber assemblies. More particularly, and according to a possible intended use, the present invention relates to a position-relative damper assist system, and also relates to a kit with corresponding components for assembling the same, to a resulting shock-absorber assembly and corresponding vehicle provided with such a damper assist system, and to corresponding methods of manufacturing, assembling and/or operating associated thereto.

BACKGROUND

Shock-absorbers are well known in the art.

Indeed, conventional shock-absorbers generally comprise a hydraulic circuit or path containing fluid (typically "oil") for carrying out a damping of shocks that a vehicle may be subjected to when travelling over a given terrain. Essentially, the damping of shocks is done via a restriction of the fluid contained in the hydraulic path of the shock-absorber.

Also known in the art are conventional shock-absorbers that rely on a compression of an elastic object (ex. a "spring") for carrying out a corresponding damping of shocks.

Also known in the art are conventional shock-absorbers that rely on a combined effect of both a compression of fluid and a compression of a spring.

It is also known in the art that for certain conventional shock-absorbers, when the shock compresses, the movement of a corresponding shaft will displace a certain amount of hydraulic fluid (ex. "oil"). This displaced oil will pass through adjustments (ex. "shims"). The range of these adjustments can vary the opening of the flow channels for the oil to pass therethrough. If the passage is smaller or reduced, then the oil will encounter more resistance to flow therethrough. If the passage is larger or increased, then the oil will encounter less resistance to flow therethrough. This resistance will permit the shock to absorb a certain amount of energy, depending on the particular static and/or dynamic loads to which the vehicle, including such a conventional shock-absorber, is subjected to.

Known to the Applicants are the following US patents which describe various devices (dampers, stabilizers, shock-absorbers, etc.) for use with motorbikes, ATVs and the like: 1,628,811; 1,957,997; 2,009,678; 4,773,514; 5,044,614; 5,516,133; and 6,401,884 B2.

It is also known in the art that there are various preload systems for mechanical springs that are currently available on the market. These preload systems are typically used for motorcycles. Generally, an adjusting knob is used to manually move a piston which will displace a fluid into a chamber, said chamber can expand or retract to compensate for displacement changes of the fluid. The preload piston can be placed remotely from the chamber to ease the accessibility of the knob. Fluid from the piston to the chamber will be connected typically with a hose.

Track systems are also well known in the art.

For example, belonging to the co-Applicant of the present case is U.S. Pat. No. 7,556,130 B2 granted on Jul. 7, 2009, to Lamoureux et al. There is described a track system for providing complementary shock absorbing capability to a primary shock absorbing assembly having a hydraulic path containing fluid. The track system includes a chamber, a damping assembly and an adjusting assembly. The chamber has opposite first and second ends, the first end of the chamber being provided with a port operatively connectable to the hydraulic path of the primary shock absorbing assembly, the port being configured for allowing fluid from the hydraulic path of the primary shock absorbing assembly to enter and exit the chamber of the track system through the port thereof. The damping assembly is configured for damping a flow of fluid entering the chamber via the port thereof. The adjusting assembly is configured for adjusting a damping mode of the damping assembly.

Dual inline hydraulic devices are also well known in the art.

For example, also belonging to the co-Applicant of the present case is U.S. Pat. No. 9,573,435 B2 granted on Feb. 21, 2007, to Lamoureux et al. There is described a system for varying an eyelet-to-eyelet distance of a vehicle. The system includes top and bottom mounting components defining the eyelet-to-eyelet distance, the top mounting component being operatively connected to a frame of the vehicle, and the bottom mounting component being operatively connected to a supporting component of the vehicle. The system also includes a telescopic component disposed about a housing of at least one of the top and bottom components, the telescopic component being displaceable with respect to said housing in response to a given input of a driver of the vehicle, for varying a distance between the top and mounting components, and thus varying the eyelet-to-eyelet distance of the vehicle.

In addition to the above-discussed conventional shock-absorber assemblies and damping systems, position-sensitive dampers are also well known in the art.

For example, known to the Applicants are the following patent documents: U.S. Pat. Nos. 4,153,237; 4,624,346; 4,798,398; 5,810,128; 6,296,092 B1; U.S. Pat. No. 6,415,895 B2; U.S. Pat. No. 6,880,684 B1; U.S. Pat. No. 6,966,412 B2; U.S. Pat. No. 7,128,192 B2; U.S. Pat. No. 7,273,137 B2; U.S. Pat. No. 7,374,028 B2; U.S. Pat. No. 7,628,259 B2; U.S. Pat. No. 7,690,666 B2; U.S. Pat. No. 8,764,029 B2; U.S. Pat. No. 8,807,299 B2; US 2009/0277734 A1; US 2010/0059321 A1; US 2010/0170760 A1; US 2011/0214956 A1; US 2011/0315494 A1; US 2012/0018263 A1; US 2012/0048665 A1; US 2012/0222927 A1; US 2012/0305350 A1; US 2013/0228404 A1; US 2013/0292218 A1; US 20014/0008160 A1; US 2014/0124312 A1; EP 1,754,909 A1; EP 2,116,739 A2; EP 2,402,626 A2; EP 2,410,203 A2; EP 2,495,472 A2; EP 2,530,355 A2; WO 00/79148 A2; and WO 2008/086605 A1.

Also known in the art are the various drawbacks associated with such conventional position-sensitive dampers.

For example, current existing position-sensitive designs incorporate "jounce" (i.e. compression) and "rebound" (i.e. "extension") characteristics as one, with minimal deviation in damping control difference between the two. In addition, existing position-sensitive dampers do not have the capability to adjust externally and/or remotely the static position of the position-sensitive mechanism to compensate for weight variations of the vehicle payload. Unfortunately, this limits the shock-absorber from having two very distinct damping curves between "jounce" and "rebound".

Also, some position-sensitive dampers rely on the principle of "concentric tubes" (i.e. "double-walls") (see for example, video at the following link: http://www.ridefox.com/technology.php?m=utv&t=ibp&ref=topnav), and such a design is not optimal for obvious reasons (for example, it is harder, longer and more costly to manufacture, assemble, inspect, maintain, and/or repair, etc.), and the resulting dynamic behavior curve of the position-sensitive damper may be subject to undesirable/abrupt "steps" as the peripheral by-pass ports are passed by the piston, as a result of "jumps" in flow rate due to the inherent nature of the construction design, etc.

Thus, it would be particularly useful to be able to provide an improved system which, by virtue of its design and components, would be able to overcome or at least minimize some of these known drawbacks associated with conventional systems.

SUMMARY OF THE INVENTION

An object of the present invention is to provide a position-relative damper assist system which, by virtue of its design and components, satisfies some of the above-mentioned need(s), and which is thus an improvement over other related damping systems and/or methods known in the prior art.

In accordance with the present invention, the above object is achieved, as will be easily understood from the present description, with a position-relative damper assist system (also referred to herein simply as "damping system" or "position-sensitive damper") such as the one briefly described herein and such as the one exemplified in the accompanying drawings.

More particularly, according to one aspect of the present invention, an object is to provide a position-relative damper assist system for use with a vehicle, the position-relative damper assist system comprising:

- top and bottom mounting components cooperating with one another to define a corresponding stroke distance between them, and being operable with respect to one another between compression and extension modes along said stroke distance, the top mounting component being operatively connectable to a frame of the vehicle, and the bottom mounting component being operatively connectable to a supporting component of the vehicle;
- a piston assembly being operatively disposed between the top and bottom mounting components, the piston assembly having a piston head being displaceable within a chamber defined about a portion of one of the top and bottom mounting components, the piston head being provided with at least one fluid passage for allowing fluid of the chamber to travel from one side of the chamber to another side of the chamber via the piston head of the piston assembly, in order to provide a corresponding damping effect;
- an adjustment assembly cooperating with the piston head of the piston assembly for adjustably varying an effective cross-sectional profile of the at least one fluid passage in order to vary a corresponding flow rate of fluid passing through said at least one fluid passage, and in turn vary the resulting damping effect; and

- a biasing assembly cooperating with the adjustment assembly for selectively varying a configuration of the adjustment assembly in response to a given input indicative of the positioning of the piston assembly within the stroke distance, in order to vary the resulting damping effect in response to a corresponding displacement-profile provided by the biasing assembly.

According to another aspect of the present invention, there is provided a shock-absorber assembly provided with the above-mentioned damper assist system.

According to another aspect of the present invention, there is provided a vehicle provided with the above-mentioned damper assist system and/or corresponding shock-absorber assembly.

According to another aspect of the invention, there is also provided a method of assembling and/or mounting the above-mentioned damper assist system onto a corresponding shock-absorber assembly and/or vehicle.

According to yet another aspect of the invention, there is also provided a method of using the above-mentioned damper assist system, shock-absorber assembly and/or corresponding vehicle.

According to yet another aspect of the invention, there is also provided a kit with components for assembling the above-mentioned damper assist system, shock-absorber assembly and/or corresponding vehicle.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned damper assist system, shock-absorber assembly, vehicle, components thereof, kit, set and/or method(s).

The objects, advantages, and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIGS. 3-23 are different views of various aspects, components and features of possible position-relative damper assist systems and/or different configurations thereof according to other possible embodiments of the present invention.

DETAILED DESCRIPTION OF PREFERRED EMBODIMENTS OF THE INVENTION

Figures 1, 2:
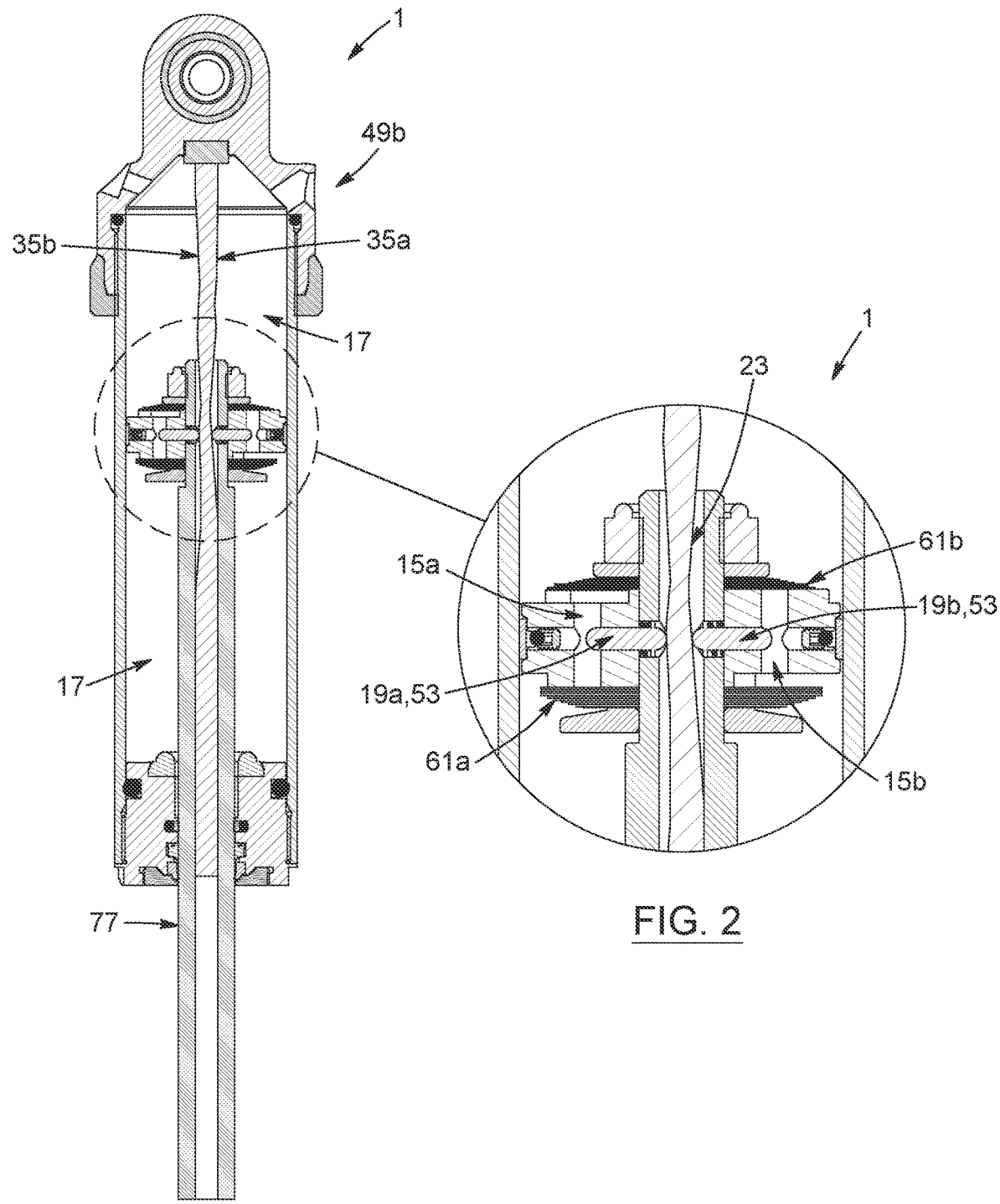
FIG. 1 is a cross-sectional representation of a shock-absorber assembly intended to be used with an external accumulator (if desired), and provided with a position-relative damper assist system according to a possible embodiment of the present invention.
FIG. 2 is an enlarged view of a portion of what is shown in FIG. 1.
Figure 12:
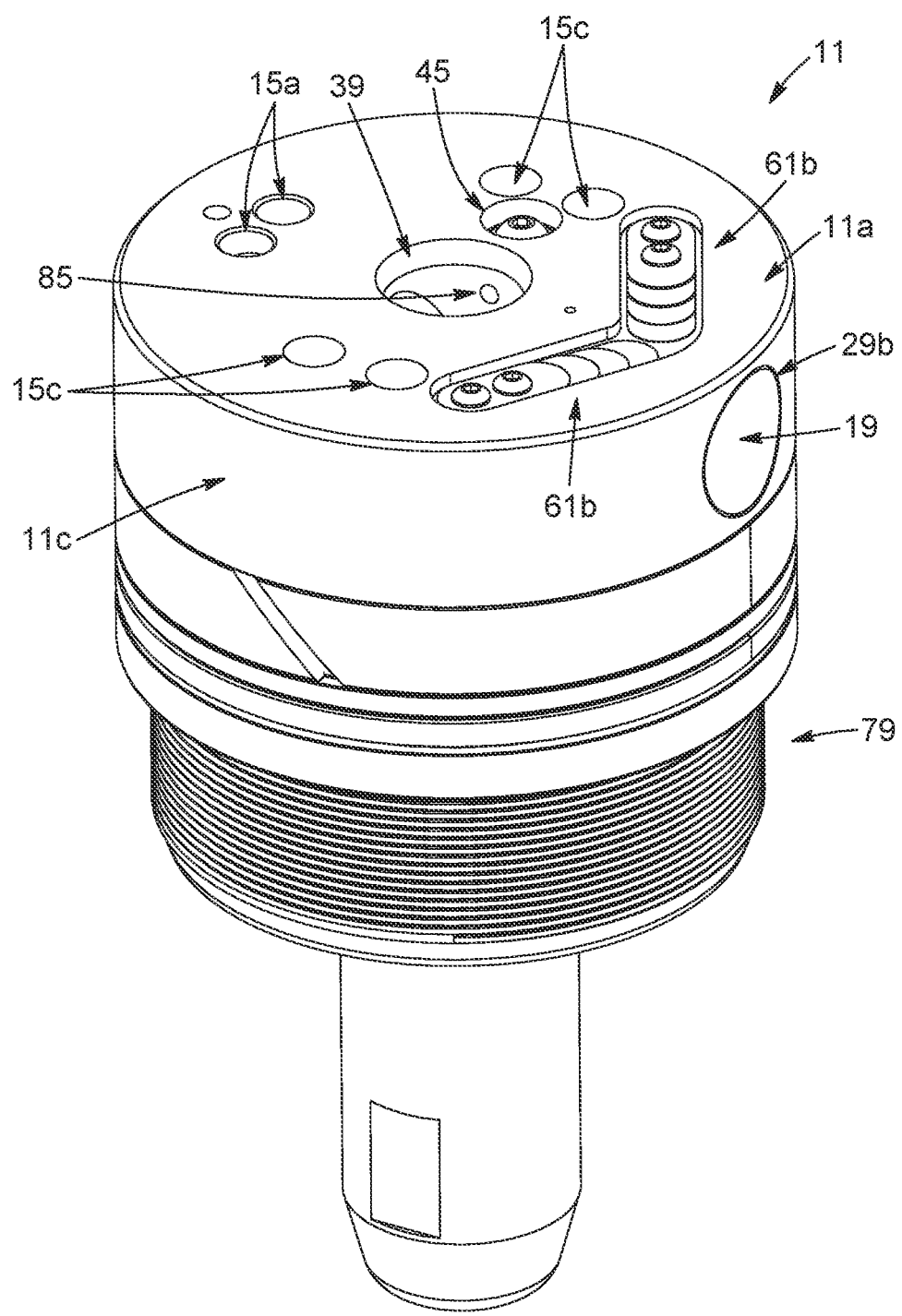

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for use within a shock-absorber assembly of a vehicle for position-relative damping purposes, it may be used with other objects and/or in other types of applications, as apparent to a person skilled in the art. For this reason, expressions such as "shock-absorber", "assembly", "vehicle", "position-relative", "damping", etc., used herein should not be taken so as to limit the scope of the present invention and include all other kinds of objects and/or applications with which the present invention could be used and may be useful. For example, the present position-relative damper assist system could also be used with and/or for "rotary dampers", for instance, given that the same principle or system could be easily adapted to this type of damper, as well.

Moreover, in the context of the present invention, the expressions "shock-absorber", "suspension", "assembly", "damping", "damper", "system", "device", "dissipation", "dissipator", "apparatus", "product", "unit", "equipment", "tool", "method" and "kit", as well as any other equivalent expressions and/or compound words thereof known in the art will be used interchangeably, as apparent to a person skilled in the art. This applies also for any other mutually equivalent expressions, such as, for example: a) "position-sensitive"; "position-relative", "position-indicative", "position-representative", etc.; b) "shock-absorber", "suspension", "damper", etc.; c) "stroke", "travel", "range", "motion", etc.; d) "distance", "position", "location", etc.; e) "passage", "channel", "conduit", "path", "orifice", "hole", "flow", etc.; f) "fastening", "securing", "restraining", "affixing", "holding", "adjusting", etc.; as well as for any other mutually equivalent expressions, pertaining to the aforementioned expressions and/or to any other structural and/or functional aspects of the present invention, as also apparent to a person skilled in the art. Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of shaft for example, or the centerline of a coiled spring, for example, and that expressions such as "connected" and "connectable", or "mounted" and "mountable", may be interchangeable, in that the present invention also relates to a kit with corresponding components for assembling a resulting fully-assembled and fully-operational damping system (and/or a resulting fully-assembled and fully-operational shock-absorber assembly and/or vehicle provided with the same, etc.).

Moreover, components of the present system(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiments of the present invention as illustrated in the accompanying drawings comprise various components, and although the preferred embodiments of the present position-relative damper assist system and corresponding portion(s)/part(s)/component(s) as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation thereinbetween, as well as other suitable geometrical configurations may be used for the present position-relative damper assist system and corresponding portion(s)/part(s)/component(s) according to the present invention, as will be briefly explained herein and as can be easily inferred herefrom by a person skilled in the art, without departing from the scope of the present invention.

Broadly described, and as better exemplified in the accompanying drawings, the present invention relates to a damping system in order to provide a position-sensitive damping, in a simpler, easier, faster, more accurate, more effective, more functional, more reliable and/or more versatile manner than what is possible with other conventional systems.

LIST OF NUMERICAL REFERENCES FOR SOME OF THE CORRESPONDING POSSIBLE COMPONENTS ILLUSTRATED IN THE ACCOMPANYING DRAWINGS 1. position-relative damper assist system (or "damping system")
3. bottom mounting component
5. top mounting component
7. stroke distance (or "travel" distance)
9. piston assembly
11. piston head
11a. top surface (of piston head)
11b. bottom surface (of piston head)
11c. side surface (of piston head)
13. chamber
15. fluid passage (of piston head)
15a. active jounce fluid passage
15b. active rebound fluid passage
15c. passive fluid passage
17. fluid (ex. "oil")
19. adjustment assembly
19a. jounce adjustment component (of adjustment assembly)
19b. rebound adjustment component (of adjustment assembly)
21. biasing assembly
23. displacement-profile
25. spring
27. supporting component (for spring)
29. lodging passage
29a. jounce lodging passage
29b. rebound lodging passage
31. shouldering portion
31a. jounce shouldering portion
31b. rebound shouldering portion
33. abutment portion
33a. jounce abutment portion
33b. rebound abutment portion
35. biasing component
35a. jounce displacement-profile surface (of biasing component)
35b. rebound displacement-profile surface (of biasing component)

37. profiled bar
39. central hole (of piston head)
41. interlocking component
41a. pin (of interlocking component)
41b. slot (for pin)
43. fastener (for pin)
45. recess (for fastener)
47. separator component
49. accumulator
49a. internal accumulator
49b. external accumulator
51. fluid (of accumulator—ex. "nitrogen")
53. plunger
55. poppet
57. ball-bearing
61. shim assembly (or "shim stack")
61a. jounce shim assembly
61b. rebound shim assembly
63. lamella
65. recess (for lamella)
67. fastener (for lamella)
69. eyelet
71. bearing (of eyelet)
73. outer-seal end cap
75. port
75a. bleed port
75b. fill port
77. piston rod
79. mounting collar (of piston head)
81. floating piston head (of internal accumulator)
83. shock-absorbing spring (i.e. coiled spring)
85. receiving passage (for pin)

As previously explained, current existing position-sensitive designs incorporate "jounce" and "rebound" characteristics as one, with minimal deviation in damping control difference between the two. In addition, existing position-sensitive dampers do not have the capability to adjust externally and/or remotely the static position of the position-sensitive mechanism to compensate for weight variations of the vehicle payload. Unfortunately, this limits the shock-absorber from having two very distinct damping curves between "jounce" and "rebound".

In contrast, and broadly described, the present invention, as exemplified in the accompanying drawings, relates to a damping system (i.e. "position-relative damper assist system", etc.) designed in such a way to remove this similarity and allow damping curves to reflect what is required to achieve best performances for ride quality and handling. By integrating the design within the piston and rod assembly, for example, the need for double-wall or external bypass tube assemblies is removed. The design can easily be integrated with existing technology which does not currently make use of this space.

The present position-relative damper assist system (1) may come in the form of a damper assist system (1) including one and/or several of the following possible components and features (and/or different possible combination(s) and/or permutation(s) thereof):

Indeed, according to one possible embodiment, and as can be easily understood when referring to the accompanying drawings, there is provided a position-relative damper assist system (1) for use with a vehicle (whether the vehicle be provided with wheel(s), skid(s), track(s), and/or etc.). The position-relative damper assist system (1) may comprise top and bottom mounting components (5,3) cooperating with one another to define a corresponding "stroke" distance (7) (or "travel" distance) between them, and being operable with respect to one another between compression (i.e. "jounce") and extension (i.e. "rebound") modes along said stroke distance, the top mounting component (5) being operatively connectable to a frame of the vehicle, and the bottom mounting component (3) being operatively connectable to a supporting component of the vehicle. The position-relative damper assist system (1) may also comprise a piston assembly (9) being operatively disposed between the top and bottom mounting components (5,3), the piston assembly (9) having a piston head (11) being displaceable within a chamber (13) defined about a portion of one of the top and bottom mounting components (5,3), the piston head (11) being provided with at least one fluid passage (15) for allowing fluid (17) of the chamber (13) to travel from one side of the chamber (13) to another side of the chamber (13) via the piston head (11) of the piston assembly (9), in order to provide a corresponding damping effect. The position-relative damper assist system (1) also comprises an adjustment assembly (19) (whether mechanical, electro-mechanical, electro-magnetic, magnetized (ex. with magnets, etc.), electric, computerized, other, and/or a combination thereof, etc.) cooperating with the piston head (11) of the piston assembly (9) for adjustably varying an effective cross-sectional profile of the at least one fluid passage (15) in order to in turn vary a corresponding flow rate of fluid (17) passing through said at least one fluid passage (15), and in turn vary the resulting damping effect. The position-relative damper assist system (1) also comprises a biasing assembly (21) (whether mechanical, electro-mechanical, electro-magnetic, magnetized (ex. with magnets, etc.), electric, computerized, other, and/or a combination thereof, etc.) cooperating with the adjustment assembly (19) for selectively varying a configuration of the adjustment assembly (19) in response to a given input indicative of the positioning of the piston assembly (9) within the stroke distance (7), in order to vary the resulting damping effect in response to a corresponding displacement-profile (23) provided by the biasing assembly (21).

Other possible aspect(s), object(s), embodiment(s), variant(s), and/or resulting advantage(s) of the position-relative damper assist system (1), all being preferred and/or optional, are briefly explained hereinbelow, and can be easily understood and/or inferred from the accompanying drawings, as well.

For example, the at least one fluid passage (15) of the piston head (11) can comprise at least one active jounce fluid passage (15a) for allowing fluid (17) of the chamber (13) to travel from one side of the chamber (13) to another side of the chamber via the piston head (11) of the piston assembly (9) during the compression mode, and the adjustment assembly (19) can comprise a corresponding jounce adjustment component (19a) being configured for adjustably varying an effective cross-sectional profile of the at least one active jounce fluid passage (15a) in order to in turn vary a corresponding flow rate of fluid (17) passing through said at least one active jounce fluid passage (15a) during the compression mode.

The jounce adjustment component (19a) can be a spring-loaded jounce adjustment component (19a), and the adjustment assembly (19) can thus comprise a corresponding spring (25) having one extremity operatively abutting against a given supporting component (27), and having another extremity operatively pushing against the jounce adjustment component (19a) for urging the jounce adjustment component (19a) into a given default configuration, the spring-loaded jounce adjustment component (19a) being adjustably operable via the biasing assembly (21) between variable opened and closed configurations, wherein in a fully-opened configuration, the jounce adjustment component (19a) is substantially clear from the at least one active jounce fluid passage (15a) in order to allow a maximal passage of fluid (17) through the at least one active jounce fluid passage (15a), and wherein in a fully-closed configuration, the jounce adjustment component (19a) substantially blocks the at least one active jounce fluid passage (15a) in order to allow a minimal passage of fluid (17) through the at least one active jounce fluid passage (15a).

Figure 13:
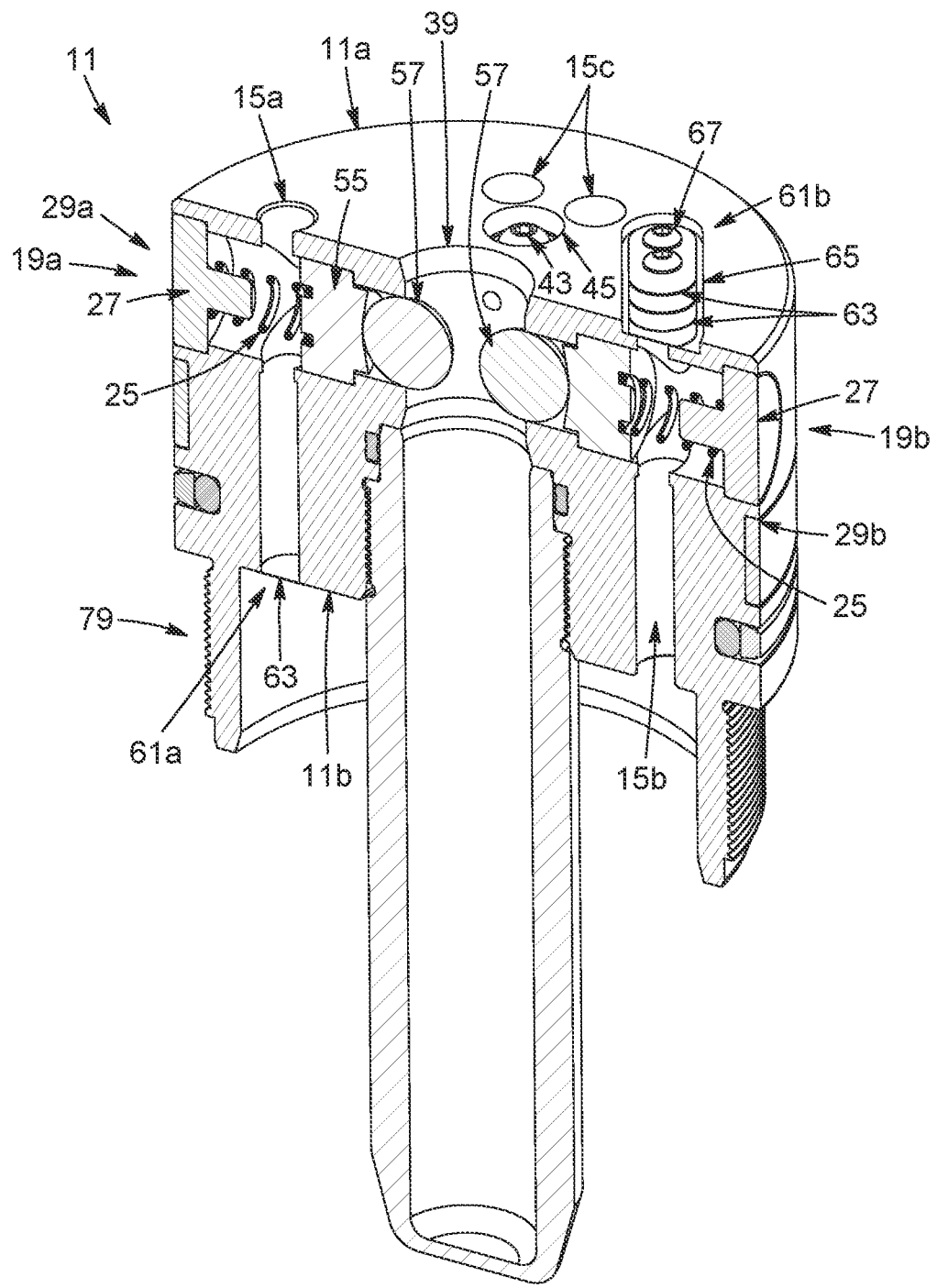

In one possible embodiment, the jounce adjustment component (19a) is positioned, shaped and sized with respect to the at least one active jounce fluid passage (15a) so that the default configuration of the jounce adjustment component (19a) corresponds to the fully-opened configuration of the jounce adjustment component (19a), as better shown in FIG. 13, for example.

Alternatively, the jounce adjustment component (19a) may be positioned, shaped and sized with respect to the at least one active jounce fluid passage (15a) so that the default configuration of the jounce adjustment component (19a) corresponds to the fully-closed configuration of the jounce adjustment component (19a).

As shown in the accompanying figures, the piston head (11) of the piston assembly (9) can comprise a jounce lodging passage (29a) being positioned, shaped and sized for receiving the jounce adjustment component (19a), the jounce lodging passage (29a) being further positioned, shaped and sized for fluidly intersecting the at least one active jounce fluid passage (15a).

The at least one active jounce fluid passage (15a) can extend longitudinally along the piston head (11), and the jounce lodging passage (29a) can extend transversally with respect to the piston head (11).

Figure 14:
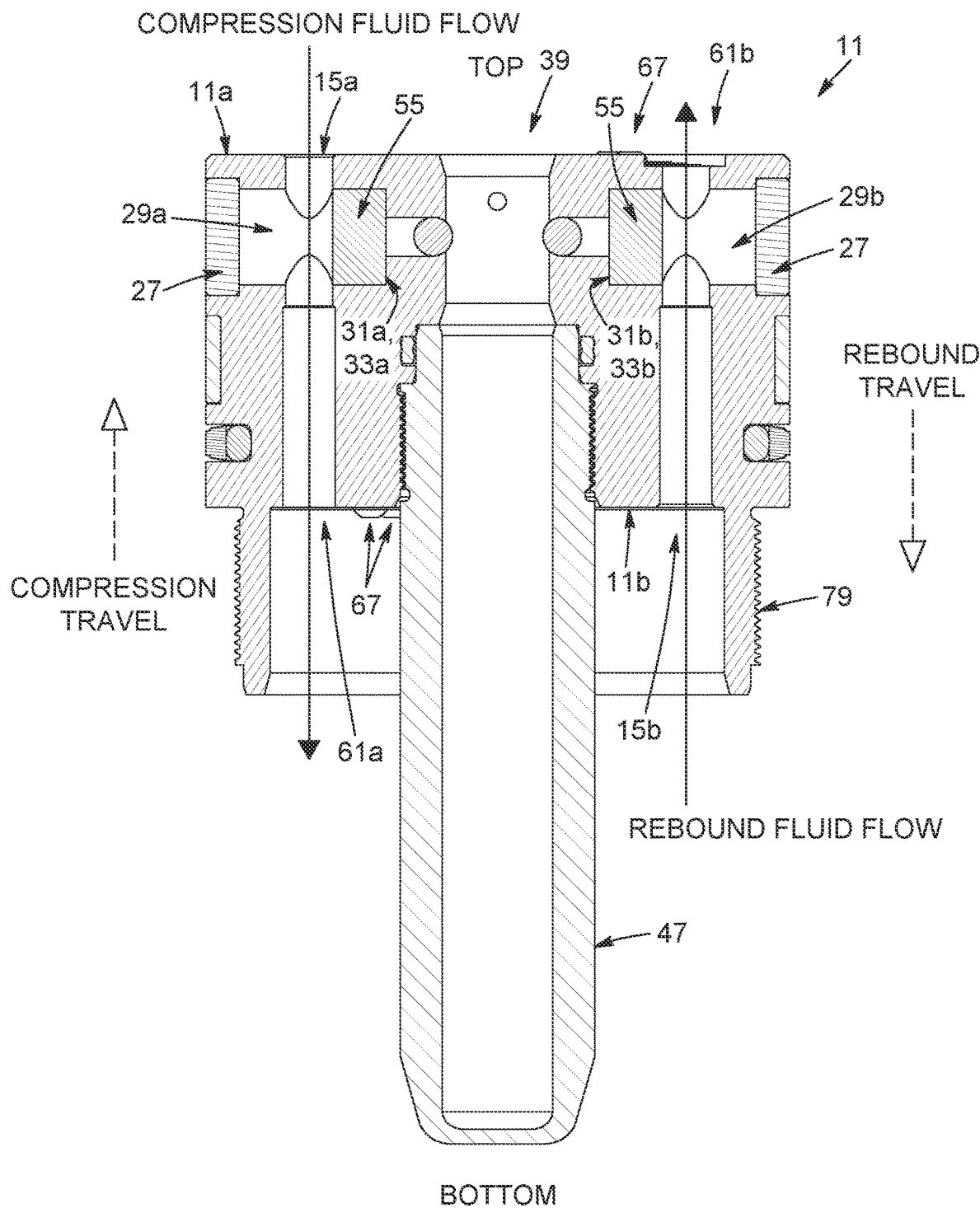
Figure 15:
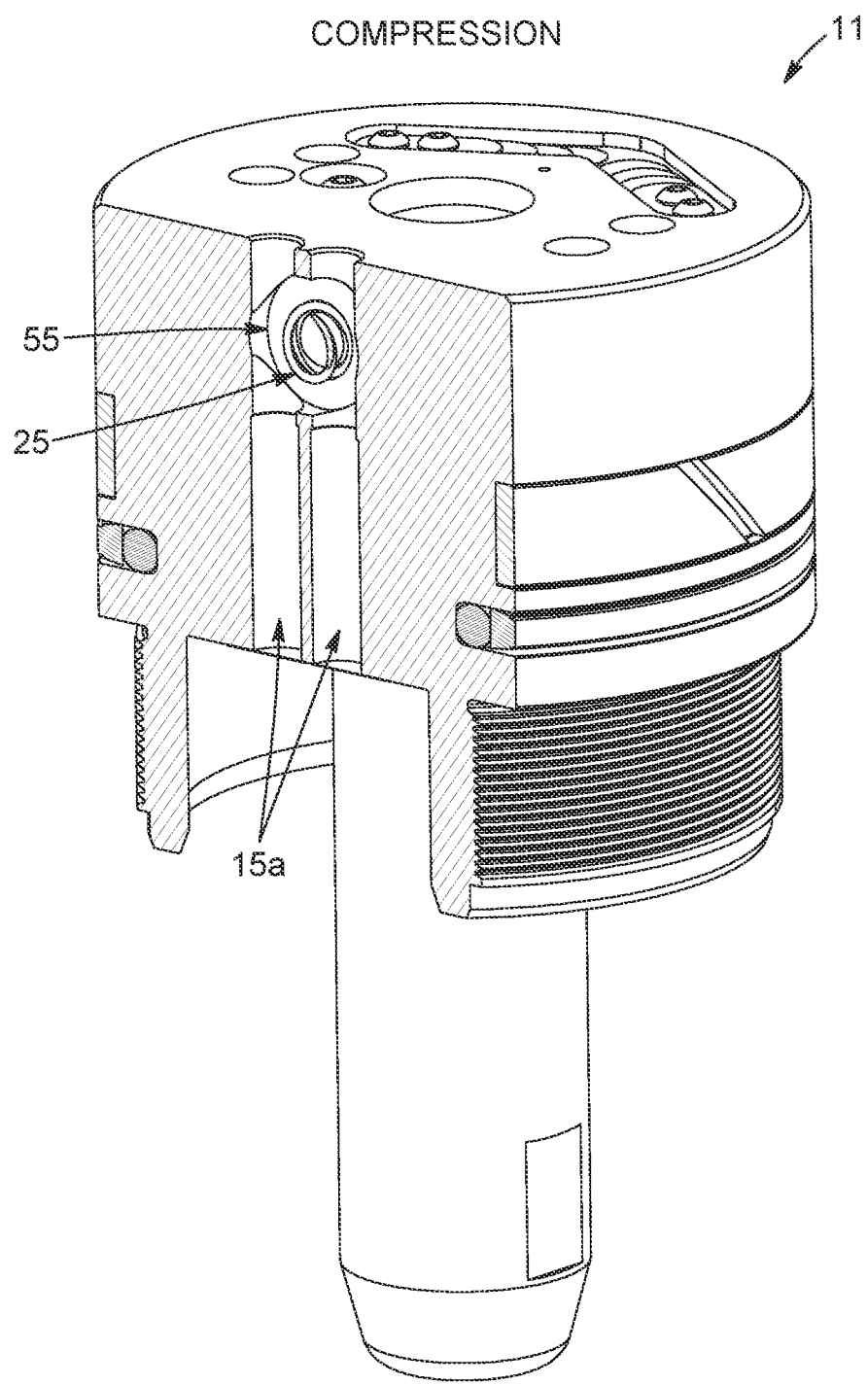
Figure 16:
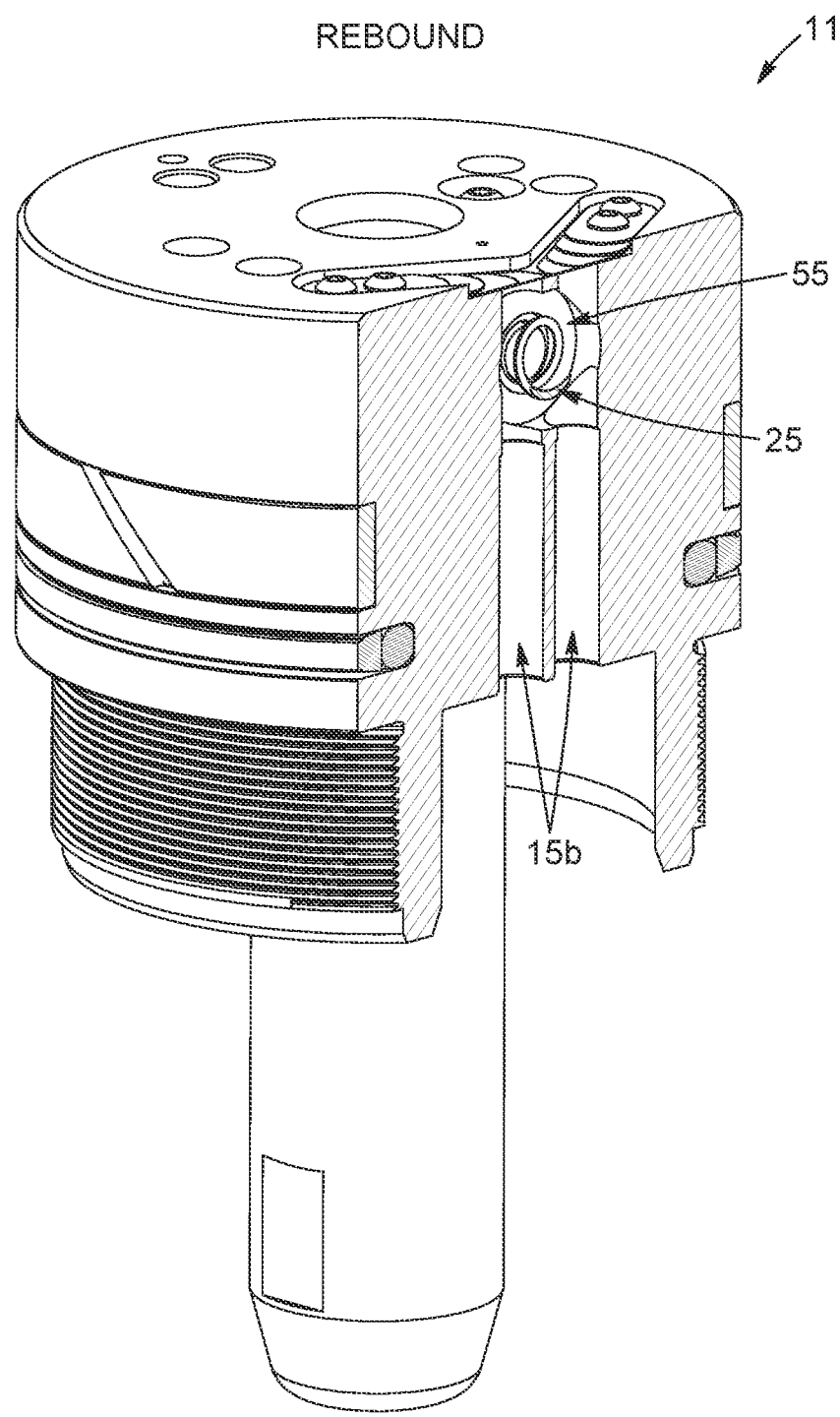
Figure 17:
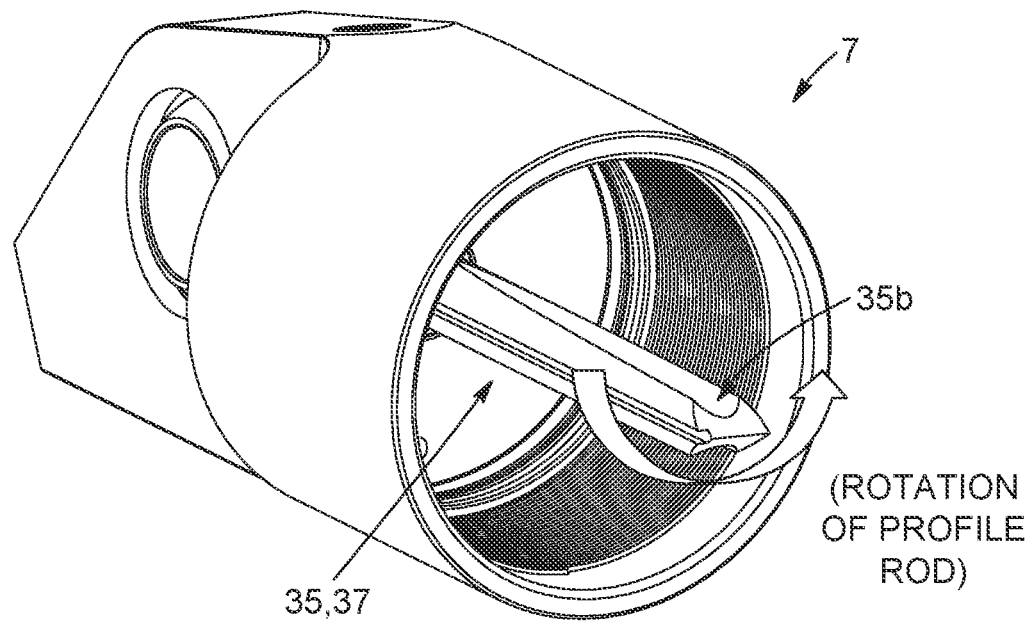
Figure 18:
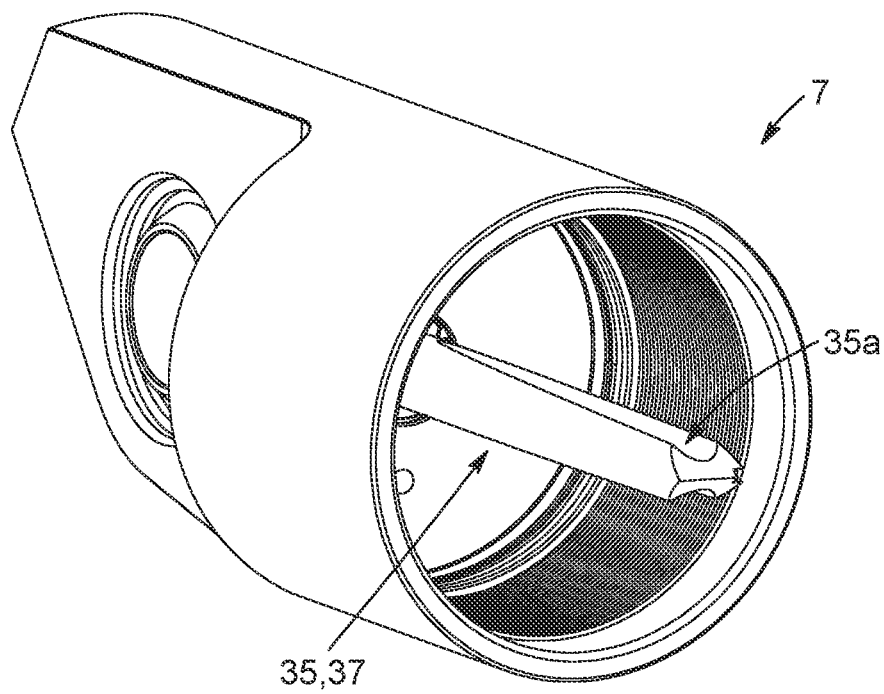
Figure 19:
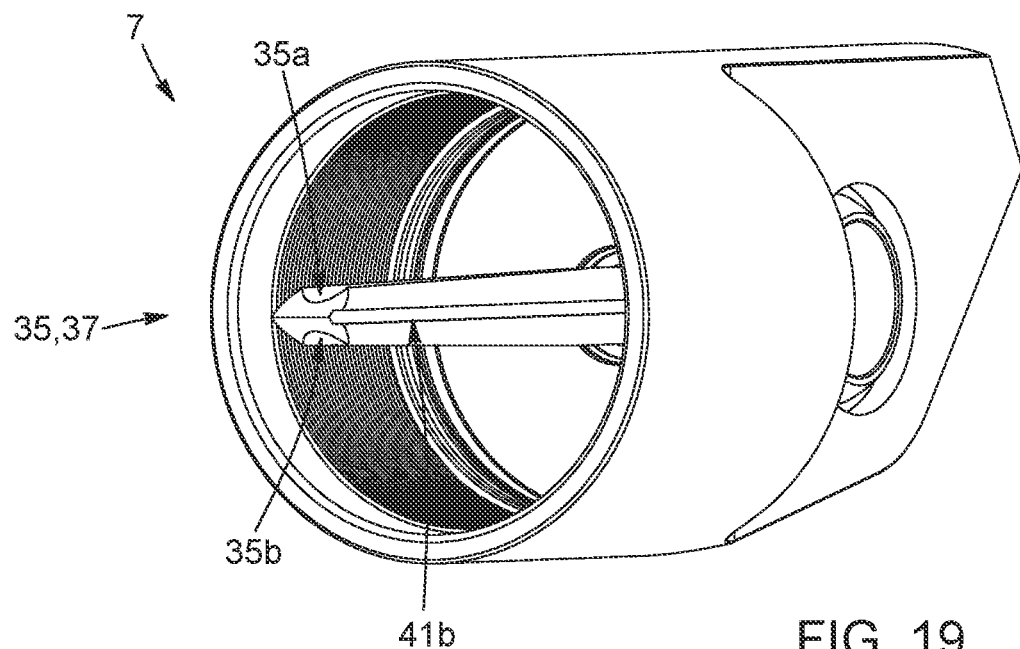
Figure 20:
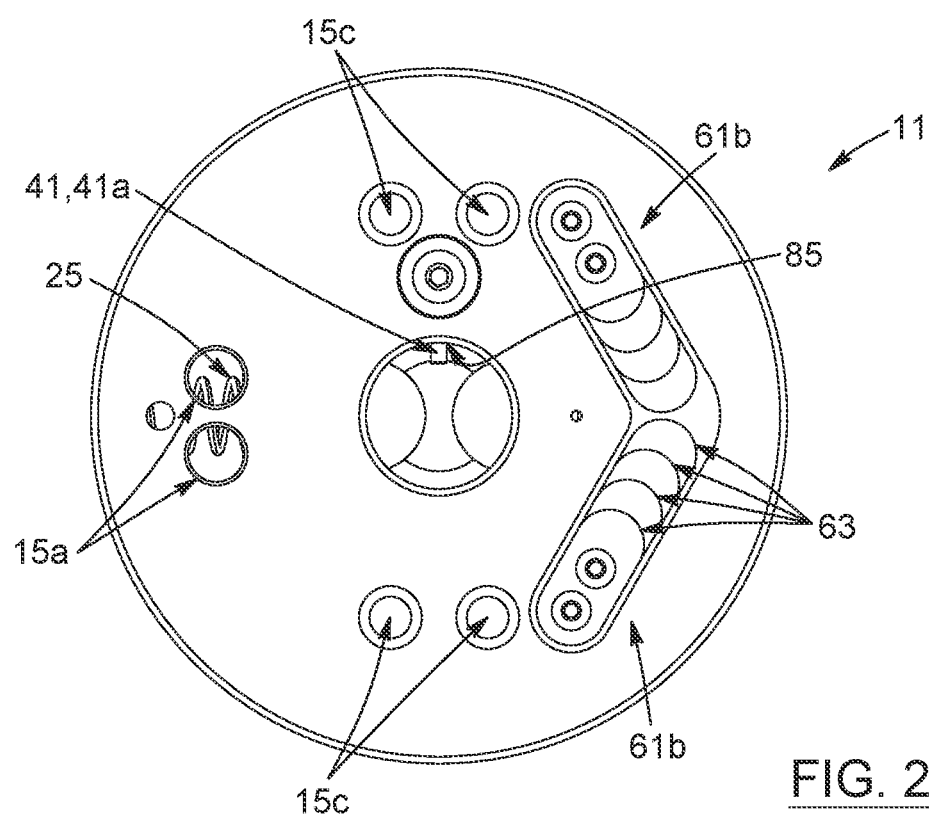
Figure 21:
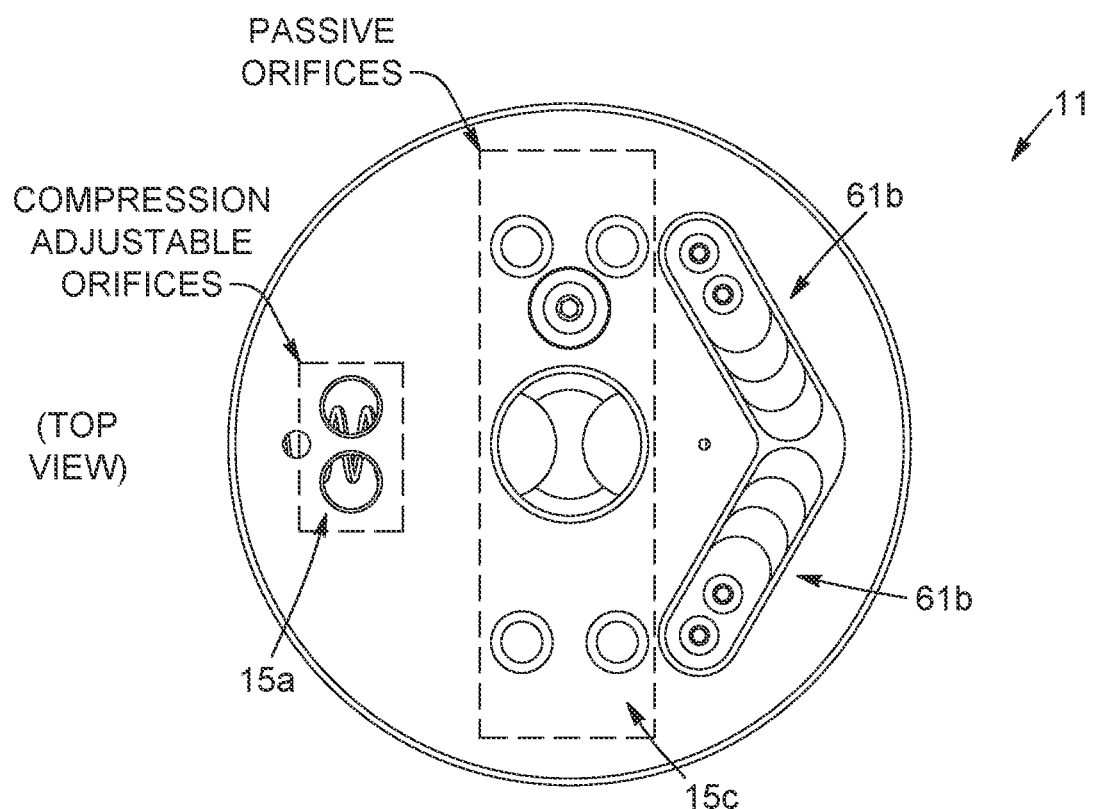
Figure 22:
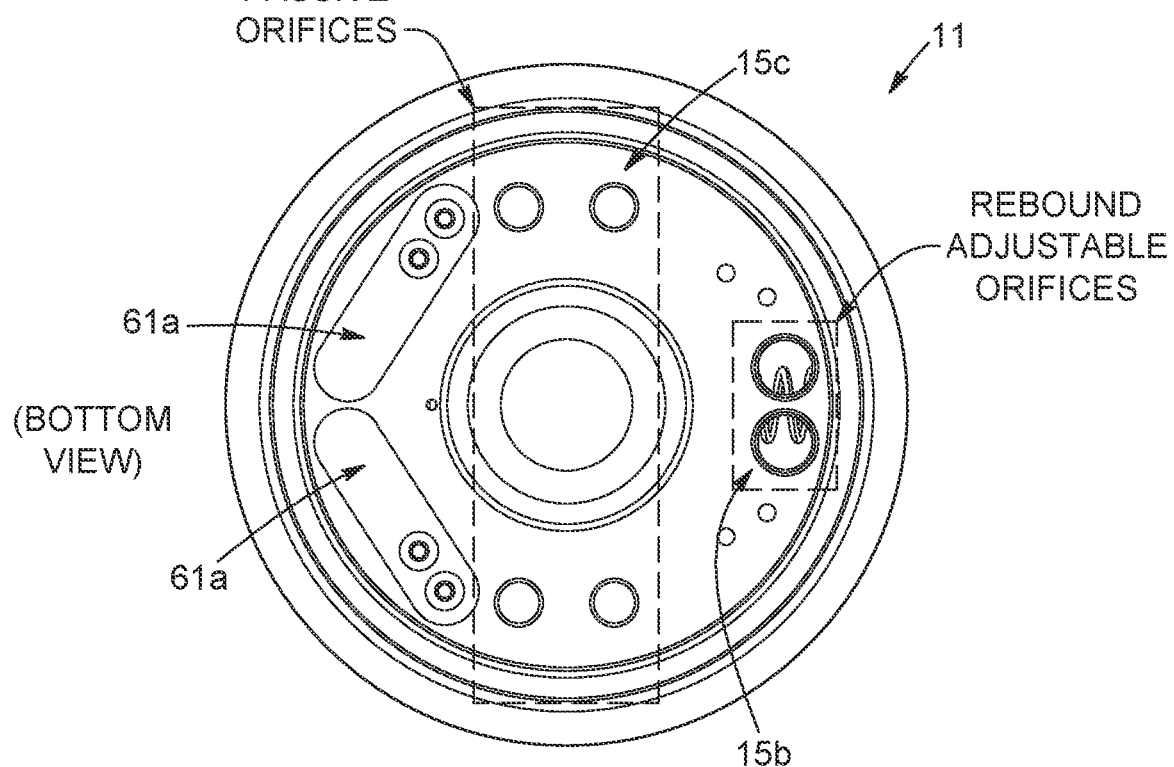
Figure 23:
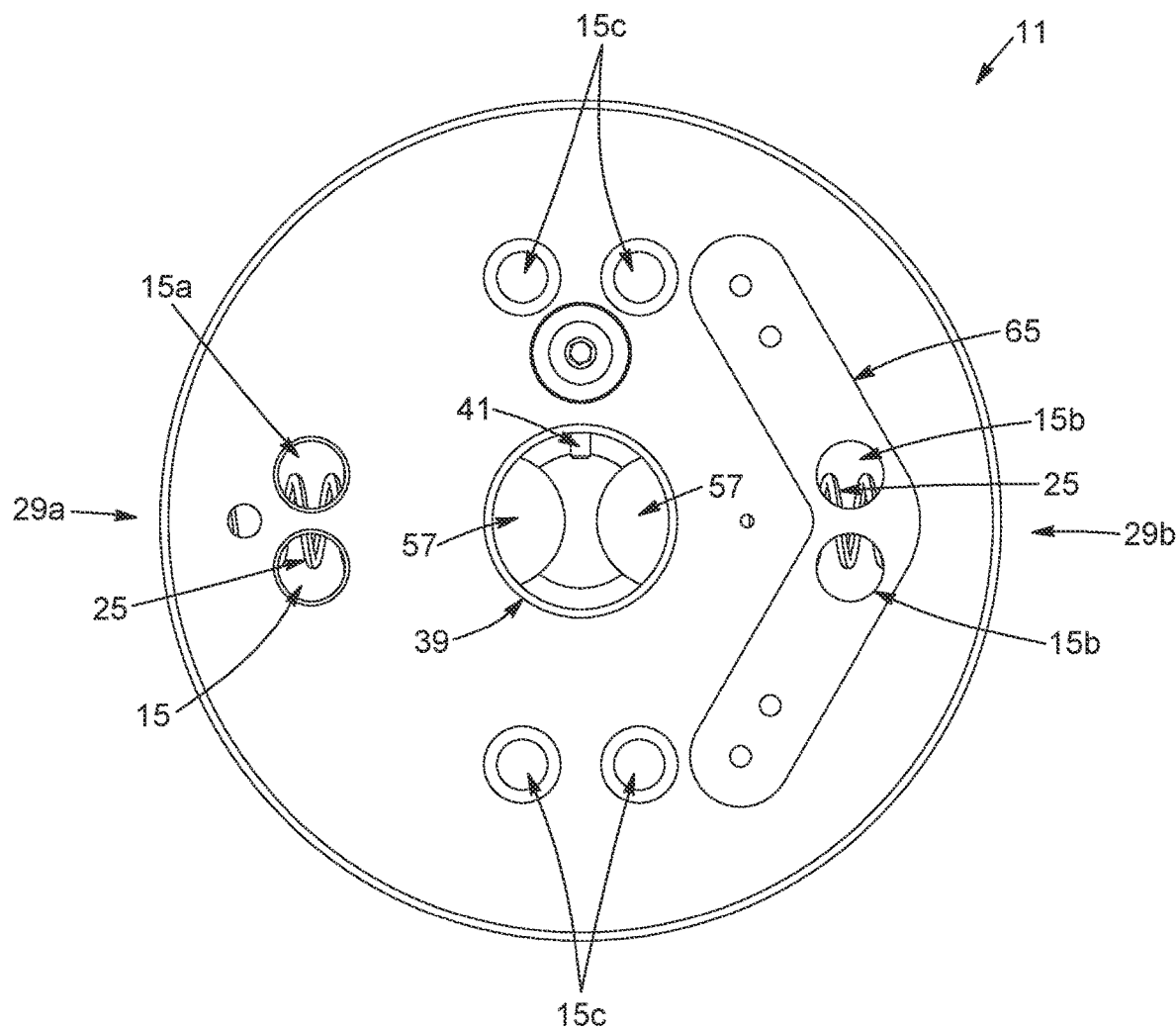

As better shown in FIGS. 13 and 14, for example, the jounce adjustment component (19a) can comprise a shouldering portion (31a) for resting against a corresponding abutment portion (33a) of the jounce lodging passage (29a) when the jounce adjustment component (19a) is in the default configuration.

Irrespective of the nature of the biasing assembly (21) being used for the present system (1), whether it be mechanical, electro-mechanical, electro-magnetic, magnetized (ex. with magnets, etc.), electric, computerized, other, and/or a combination thereof, etc.), the jounce adjustment component (19a) is configured for adjustably moving in response to the input indicative of the positioning of the piston assembly (9) within the stroke distance (7) being received from said biasing assembly (21).

The biasing assembly (21) can include a biasing component (35) provided with a jounce displacement-profile surface (35a) interacting with the jounce adjustment component (19a) for adjustably moving the jounce adjustment component (19a) with respect to the at least one active jounce fluid passage (15a) (ex. depending on a positioning of the jounce adjustment component (19a) with respect to the jounce displacement-profile surface (35a) of the biasing component (35), etc.).

The chamber (13) containing the piston head (11) of the piston assembly (9) can be defined about a portion of the top mounting component (5), and the biasing component (35) with corresponding jounce displacement-profile surface (35a) can be mounted onto the top mounting component (5) and can be disposed along the chamber (13) of said top mounting component (5), as exemplified in the accompanying drawings.

In its simplest form (ex. a mechanical version, etc.), the biasing component (35) may include a profiled bar (37) being provided with the jounce displacement-profile surface (35a), and the profiled bar (37) may be removably and pivotably mountable onto the top mounting component (5) via a corresponding attachment component (59), and may also be disposed centrally within the chamber (13) of the top mounting component (5), for example, although various other alternative disposition(s) and/or embodiment(s) are also be contemplated for the present system (1).

According to one possible embodiment, the piston head (11) comprises a corresponding central hole (39) for receiving therethrough the profiled bar (37) of the biasing assembly (21) during a relative displacement of the bottom mounting component (5) with respect to the top mounting component (5).

The piston head (11) may further comprise an interlocking component (41) disposed about the corresponding central hole (39) for interlocking with the profiled bar (37) during displacement of the profiled bar (37) through said corresponding central hole (39), and the interlocking component (41) may include a pin (41a) being removably mountable onto the piston head (11) via a fastener (43), the pin (41a) being positioned, shaped and sized for extending within the corresponding central hole (39) and for further fitting into a corresponding slot (41b) disposed about the profiled bar (37). The pin (41a) can be removably insertable into a corresponding receiving passage (85) defined about the piston head (11), for example, and the receiving passage (85) can be disposed transversally with respect to the piston head (11), and may extend from the central hole (39) of the piston head (11) to a side surface (11c) of the piston head (11), although various other alternative disposition(s) and/or embodiment(s), are also contemplated for the present system (1).

The above-mentioned fastener (43) may be positioned, shaped and sized so that a top portion thereof is lodged within a corresponding recess (45) of the piston head (11) of the piston assembly (9), so as to prevent the top portion of the fastener (45) from exceeding beyond a top surface (11a) of said piston head (11).

According to the embodiment(s) illustrated in FIGS. 3-16, the position-relative damper assist system (1) can comprise a hollow separator component (47) being removably mountable onto the piston head (11), for use with an internal accumulator (49a), the hollow separator component (47) having an opened end operatively connectable to the corresponding central hole (39) of the piston head (11), and an opposite closed end for separating a fluid (51) of the internal accumulator (49a) from a fluid of the chamber (13).

As shown, the hollow separator component (47) is preferably made long enough for receiving the profiled bar (37) when the top and bottom mounting components (5,3) are operated in the "compression" mode (see FIG. 8, for example).

Similarly, the profiled bar (37) is preferably made long enough for interacting with the jounce adjustment component (19a) when the top and bottom mounting components (5,3) are operated in the "extension" mode (see FIG. 9, for example).

In one alternative (as better shown in FIGS. 1 and 2), the jounce adjustment component (19a) can include a spring-loaded plunger (53) having one end interacting with the jounce displacement-profile surface (35a) for moving in response to a corresponding contour of said jounce displacement-profile surface (35a).

In another alternative (as better shown in FIGS. 3-23), the jounce adjustment component (19a) can include a spring-loaded poppet (55) provided with an adjacent ball-bearing (57) interacting with the jounce displacement-profile surface (35a) for moving in response to a corresponding contour of said jounce displacement-profile surface (35a).

The poppet (55) can also comprise a shouldering portion (31a) for resting against a corresponding abutment portion (33a), and a cross-sectional profile of the ball-bearing (57) is preferably made smaller than a cross-sectional profile of the poppet (55).

According to another possible embodiment, the jounce displacement-profile surface (35a) is a curved jounce displacement-profile surface (35a) for providing at least two contact points to a corresponding component being operatively connected to the jounce adjustment component (19a). As can be easily understood, a jounce displacement-profile surface (35a) with only one contact point could also be used, and the fact that the jounce displacement-profile surface (35a) may be "curved" (and/or shaped otherwise, etc.) and provide a plurality of contact points (ex. two or more, etc.) is particularly advantageous for improved durability of the part(s), etc., when the adjustment assembly (19) and the biasing assembly (21) interact "mechanically", for example.

According to another possible embodiment, the at least one active jounce fluid passage (15a) comprises a pair of active jounce fluid passages (15a) each for allowing fluid (17) of the chamber (13) to travel from one side of the chamber (13) to another side of the chamber via the piston head (11) of the piston assembly (9) during the compression mode, and the jounce adjustment component (19a) can be configured for adjustably varying an effective cross-sectional profile of both active jounce fluid passages (15a) in order to in turn vary a corresponding flow rate of fluid (17) passing through the pair of active jounce fluid passages (15a) during the compression mode.

One end of the at least one active jounce fluid passage (15a) may be provided with a corresponding jounce shim assembly (61a) being configured for shimming fluid exiting said end of the at least one active jounce fluid passage (15a) during the compression mode.

The jounce shim assembly (61a) can be further configured for preventing fluid from entering said end of the at least one active jounce fluid passage (15a) (for example, of each active jounce fluid passage (15a), etc.) during the "extension" mode.

The jounce shim assembly (61a) may include a series of lamellae (63) being stackable onto one another, and the series of lamellae (63) may be nestable within a corresponding recess (65) defined about the piston head (11) of the piston assembly (9). The series of lamellae (63) can be secured onto the piston head (11) via at least one fastener (67), and the at least one fastener (67) is preferably positioned, shaped and sized so that a top portion thereof is prevented from exceeding beyond a top surface (11a) of the piston head (11) of the piston assembly (9).

According to another possible embodiment, the at least one fastener (67) includes a pair of fasteners (67) configured for threaded engagement into the series of lamellae (63) and piston head (11), and the series of lamellae (63) may include a plurality of oblong lamellae (63) of different lengths, with a longest lamella (63) being positioned at a bottommost portion of the series of lamellae (63) and a shortest lamella (63) being positioned at an upper portion of the series of lamellae (63), each lamella (63) of the series of lamellae (63) being shorter than a preceding bottom lamella (63), for example.

According to another aspect of the present system (1), the at least one fluid passage (15) of the piston head (11) can also comprise at least one active rebound fluid passage (15b) for allowing fluid (17) of the chamber (13) to travel from one side of the chamber (13) to another side of the chamber (13) via the piston head (11) of the piston assembly (9) during the extension mode, and the adjustment assembly (19) can comprise a corresponding rebound adjustment component (19b) being configured for adjustably varying an effective cross-sectional profile of the at least one active rebound fluid passage (15b) in order to in turn vary a corresponding flow rate of fluid (17) passing through said at least one active rebound fluid passage (15b) during the extension mode.

The rebound adjustment component (19b) can be a spring-loaded rebound adjustment component (19b), and the adjustment assembly (19) can thus comprise a corresponding spring (25) having one extremity operatively abutting against a given supporting component (27), and having another extremity operatively pushing against the rebound adjustment component (19b) for urging the rebound adjustment component (19b) into a given default configuration, the spring-loaded rebound adjustment component (19b) being adjustably operable via the biasing assembly (21) between variable opened and closed configurations, wherein in a fully-opened configuration, the rebound adjustment component (19b) is substantially clear from the at least one active rebound fluid passage (15b) in order to allow a maximal passage of fluid (17) through the at least one active rebound fluid passage (15b), and wherein in a fully-closed configuration, the rebound adjustment component (19b) substantially blocks the at least one active rebound fluid passage (15b) in order to allow a minimal passage of fluid (17) through the at least one active rebound fluid passage (15b).

In one possible embodiment, the rebound adjustment component (19b) is positioned, shaped and sized with respect to the at least one active rebound fluid passage (15b) so that the default configuration of the rebound adjustment component (19b) corresponds to the fully-opened configuration of the rebound adjustment component (19b), as better shown in FIG. 13, for example.

Alternatively, the rebound adjustment component (19b) may be positioned, shaped and sized with respect to the at least one active rebound fluid passage (15b) so that the default configuration of the rebound adjustment component (19b) corresponds to the fully-closed configuration of the rebound adjustment component (19b).

As shown in the accompanying figures, the piston head (11) of the piston assembly (9) can comprise a rebound lodging passage (29b) being positioned, shaped and sized for receiving the rebound adjustment component (19b), the rebound lodging passage (29b) being further positioned, shaped and sized for fluidly intersecting the at least one active rebound fluid passage (15b).

The at least one active rebound fluid passage (15b) may extend longitudinally along the piston head (11), and whereas the rebound lodging passage (29b) may extend transversally with respect to the piston head (11).

As better shown in FIGS. 13 and 14, the rebound adjustment component (19b) can comprise a shouldering portion (31b) for resting against a corresponding abutment portion (33b) of the rebound lodging passage (29b) when the rebound adjustment component (19b) is in the default configuration.

The rebound adjustment component (19b) is configured for adjustably moving in response to the input indicative of the positioning of the piston assembly (9) within the stroke distance (7) being received from the biasing assembly (21).

The above-described single biasing component (35) (and/or a separate one) can be further provided with a rebound displacement-profile surface (35b) interacting with the rebound adjustment component (19b) for adjustably moving the rebound adjustment component (19b) with respect to the at least one active rebound fluid passage (15b) (ex. depending on a positioning of the rebound adjustment component (19b) with respect to the rebound displacement-profile surface (35b) of the biasing component (35), etc.).

Similarly to what was discussed above, the biasing component (35) with corresponding rebound displacement-profile surface (35b) can be mounted onto the top mounting component (7) and can be disposed along the chamber of said top mounting component (7). Also, the profiled bar (37) may be further provided with the rebound displacement-profile surface (35b), and is preferably made long enough for interacting with the rebound adjustment component (19b) when the top and bottom mounting components (5,3) are operated in the "extension" mode (see FIG. 9, for example).

In one alternative embodiment (as better shown in FIGS. 1 and 2), the rebound adjustment component (19b) can include a spring-loaded plunger (53) having one end interacting with the rebound displacement-profile surface (35b) for moving in response to a corresponding contour of said rebound displacement-profile surface (35b).

In another alternative embodiment (as better shown in FIGS. 3-23), the rebound adjustment component (19b) can include a spring-loaded poppet (55) provided with an adjacent ball-bearing (57) interacting with the rebound displacement-profile surface (35b) for moving in response to a corresponding contour of said rebound displacement-profile surface (35b).

This poppet (55) can also comprise a shouldering portion (31b) for resting against a corresponding abutment portion (33b), and a cross-sectional profile of the ball-bearing (57) is preferably made smaller than a cross-sectional profile of the poppet (55).

According to another possible embodiment, the rebound displacement-profile surface (35b) is a curved rebound displacement-profile surface (35b) for providing at least two contact points to a corresponding component being operatively connected to the rebound adjustment component (19b). The rebound displacement-profile surface (35b) may be provided with a single contact point, as previously discussed when referring to the "jounce" counterpart.

According to another possible embodiment, the at least one active rebound fluid passage (15b) comprises a pair of active rebound fluid passages (15b) each for allowing fluid (17) of the chamber (13) to travel from one side of the chamber (13) to another side of the chamber (13) via the piston head (11) of the piston assembly (9) during the extension mode, and the rebound adjustment component (19b) can be configured for adjustably varying an effective cross-sectional profile of both active rebound fluid passages (15b) in order to in turn vary a corresponding flow rate of fluid (17) passing through the pair of active rebound fluid passages (15b) during the extension mode.

One end of the at least one active rebound fluid passage (15b) may be provided with a corresponding rebound shim assembly (61b) being configured for shimming fluid (17) exiting said end of the at least one active rebound fluid passage (15b) during the "extension" mode.

The rebound shim assembly (61b) can be further configured for preventing fluid (17) from entering said end of the at least one active rebound fluid passage (15b) (for example, of each active rebound fluid passage (15b), etc.) during the "compression" mode.

The rebound shim assembly (61b) can have components and features similar to that of the jounce shim assembly (61a).

As can be easily understood also, even though "shim" assemblies have been given as way of possible examples for directional control of the fluid, various other suitable alternative assemblies and/or mechanisms could be used with the present system (1) in order to achieve such a directional flow of the fluid, for each given passage (15,15a,15b) of the piston head (11) and/or overall system (1), depending on the application(s) for which it is intended for, and/or the desired end result(s). For example, such a directional control and/or flow of the fluid could be achieved via a "ball bearing" and a machined "seat", for example, in which flow can either travel around the ball bearing through the piston head, or the ball bearing becomes seated, blocking all flow through the desired passage (15,15a,15b), etc., as can be easily understood by a person skilled in the art.

According to another possible embodiment, the at least one active jounce fluid passage (15a) and corresponding jounce adjustment component (19a) can be disposed on one side of the piston head (11), and the at least one active rebound fluid passage (15b) and corresponding rebound adjustment component (19b) can be disposed on another opposite side of the piston head (11), as better shown in FIG. 13, for example.

The jounce lodging passage (29a) and the rebound lodging passage (29b) can be fluidly connected to one another, and the jounce lodging passage (29a) and the rebound lodging passage (29b) can be further fluidly connected to the corresponding central hole (39) of the piston head (11), as also exemplified in FIG. 13.

The at least one fluid passage (15) of the piston head (11) can comprise at least one passive fluid passage (15c) for allowing fluid (17) of the chamber (13) to travel from one side of the chamber (13) to another side of the chamber via the piston head (11) of the piston assembly (9) during either one (and preferably, both) of the compression and extension modes.

Optionally, the at least one fluid passage (15) of the piston head (11) comprises a pair of passive fluid passages (15c) for allowing fluid (17) of the chamber (13) to travel from one side of the chamber (13) to another side of the chamber (13) via the piston head (11) of the piston assembly (9) during either one (and preferably, both) of the compression and extension modes.

According to another possible embodiment, the at least one fluid passage (15) of the piston head (11) includes at least one fluid passage (15) being internal to the piston head (11) of the piston assembly (9), as exemplified in the accompanying figures, but according to alternative possible embodiments of the present system (1), the at least one fluid passage (15) of the piston head (11) can also and/or alternatively include at least one fluid passage (15) being external to the piston head (11) of the piston assembly (9).

According to another possible embodiment, at least one of the top and bottom mounting components (5,3) is provided with an eyelet (69), and optionally, the top and bottom mounting components (5,3) are each provided with a corresponding eyelet (69), and the stroke distance (7) of the top and bottom mounting components (5,3) corresponds to an "eyelet-to-eyelet" distance. Optionally also, each eyelet (69) may also be provided with a corresponding bearing (71).

It is worth mentioning that even though "eyelet(s)" have been given as a way of possible embodiments, various other suitable alternative assemblies and/or mechanisms could be used with the present system (1) in order to achieve a similar and/or different intended functional purpose. Indeed, instead of using "eyelet(s)" for the shock mount, one could employ shocks which utilize "bayonet style" on one and/or both ends, as can be easily understood by a person skilled in the art.

As better shown in the accompanying figures, the position-relative damper assist system (1) can comprise an outer-seal end cap (73) for sealingly closing an interface between the top and bottom mounting components (5,3), the chamber (13) can be operatively connected to at least one corresponding port (75) selected from the group consisting of bleed port (75a) and fill port (75b).

The present system (1) may be used with and/or for a variety of different piston assemblies (9), but according to one possible embodiment, the piston assembly (9) can comprise a piston rod (77) operatively extending between the bottom mounting component (3) of the position-relative damper assist system (1) and the piston head (11) of the piston assembly (9), with the piston head (11) being removably mountable onto the piston rod (77), if so desired via threading, for example, and the piston head (11) may also comprise a mounting collar (79) extending from a bottom surface (11b) of the piston head (11), the mounting collar (79) being configured for securing onto the piston rod (77).

Optionally also, the piston rod (77) can comprise a hollow section being provided an internal accumulator (49a) having a floating piston head (81), and the floating piston head (81) may have a cross-sectional shape being complementary to that of an adjacent separator component (47), for allowing the floating piston head (81) to travel within a greater range for a same given length of the internal accumulator (49a), as better shown in FIG. 5, for example.

FIGS. 1 and 2 show how the position-relative damper assist system (1) can comprise and/or be used with an external accumulator (49b) configured for cooperating with the piston assembly (9).

Optionally also, the position-relative damper assist system (1) can comprise a shock-absorbing spring (83) interacting between the bottom and top mounting components (3,5), and the shock-absorbing spring (83) can be a coil spring having one end operatively secured to the top mounting component (5) (via a "spring seat" and/or any other suitable component, for example), and another end operatively secured to the bottom mounting component (3) (via a "retainer" and/or any other suitable component, for example).

According to another possible aspect of the present invention, there is also provided a kit with components for assembling a fully-assembled and fully-operational position-relative damper assist system (1) such as the one described and/or alluded to in the present patent specification, and accompanying drawings. According to yet another possible aspect of the present invention, there is also provided a vehicle with such a position-relative damper assist system (1). According to yet another possible aspect of the present invention, there is also provided a piston head (11) for use with a piston assembly (9) of such a position-relative damper assist system (1), given that the piston head (11) could also ultimately be commercialized (ex. "sold", etc.) separately and independently from the position-relative damper assist system (1), the piston head (11) having one and/or several of the various components and/or features described and/or alluded to in the present patent specification, and accompanying drawings. According to yet another possible aspect of the present invention, there is also provided a kit with components for assembling such a piston head (11).

Referring back now to FIGS. 1 and 2 (version that can comprise and/or be used with an external accumulator), and regarding a functionality overview of the present system, and according to a possible intended use, as can be easily understood by a person skilled in the art: as the shock-absorber piston rod (77) is compressed, hydraulic fluid transfers through the piston assembly (9) to the rod side. Any excess fluid, specifically, the volume equivalent to the rod stroke which is being compressed, is transferred to the accumulator via the accumulator connection port (49b). Transfer of the fluid from the piston side to the rod side occurs through the jounce orifices (15a) located on the piston assembly (9). The shape, size and quantity of the jounce orifices can vary.

The damping of the jounce orifice is achieved through the jounce profile tracking assembly (19a,53), which tracks/follows the contours of the damping profile rod—jounce (35a) located in the piston rod (77). The damping profile rod (35a,35b) is fixed at the rod attachment point (59), which allows it to rotate freely within the piston rod (77). As the shock-absorber travels in compression, the jounce profile tracking assembly (19a,53) follows the contours of the profile, opening/restricting the flow through the jounce orifice(s) (15a) as required. The profile details are selected to provide specific position-relative damping characteristics.

According to a possible embodiment, the jounce profile tracking assembly (19a,53) can be preloaded in a way to ensure proper contact with the damping profile rod (35a, 35b), naturally allowing full flow through the jounce orifices (15a) when the contour is smallest and greatest restriction when over profile peaks. The preload of the tracking assemblies (19a,53) can be achieved but is not limited to compression springs, wave springs, etc. The profile tracking assembly (19b,53) design details can vary in shape, size and quantity. In some instances, the design may be required to support a threshold flow rate/pressure in which some jounce/rebound orifices are not position specific. In addition, the motion of a single profile tracking assembly could adjust damping within numerous damping orifices, jounce or rebound, depending on functional requirements.

The damping profile rod (35a,35b) can be adjusted to allow easy modification of damping characteristics relative to position. This could be achieved through an adjustment screw located on the bottom of the piston rod (77), for example. The jounce and rebound profiles can be application specific, and in some instances, may mimic one another. The cross-sectional design of the damping profile rod (35a,35b, 37) could be a variety of shapes such as an 'X', square, or any other suitable and/or functionally equivalent shape, etc.

Upon rebound travel, fluid is transferred through the rebound orifice(s) (15b) located on the piston assembly (9). Similar to compression travel, damping is controlled via the damping profile tracking assembly (19b,53) in conjunction with the damping profile rod—rebound (35b). Rebound orifices (15b) can vary in shape, size and quantity. Fluid from the accumulator port (49b), equivalent to the volume of rod which is extended, returns to the piston side of the shock-absorber.

According to a possible embodiment, "jounce" and "rebound" damping can be controlled through the inclusion of jounce (61a) and rebound (61b) shim stacks. The stacks limit flow in their respective directions of travel, effectively functioning as directional flow valves. This allows the design to have independent jounce and rebound position-relative damping control. The size of the orifices is influenced by the tracking profile assembly. The tracking profile assembly can be made as one device with profile on both sides as shown on surface (35*b*) and surface (35*a*). The tracking profile assembly can also be made of two separate tracking profile ass. An adjustment mechanism made of one adjustment knob or two adjustment knobs could also be used to pre-set the static position of the position damping. The adjustment mechanism could also be used to operate the knobs, etc.

As may now be appreciated, the present invention is a substantial improvement over the damping systems of the prior art in that, by virtue of its design and components, as briefly explained herein, the present system enables to overcome or at least minimize some of the known drawbacks associated with conventional systems, providing for a simpler, easier, faster, more accurate, more effective, more functional, more reliable and/or more versatile position-relative damper assist system than what is possible with other conventional systems.

Indeed, as previously explained, current existing position-sensitive designs incorporate jounce and rebound characteristics as one, with minimal deviation in damping control difference between the two. In addition, existing position-sensitive dampers do not have the capability to adjust externally or remotely the static position of the position-sensitive mechanism to compensate for weight variations of the vehicle payload. Unfortunately, this limits the shock-absorber from having two very distinct damping curves between jounce and rebound.

In contrast, and the present damping system is designed in such a way to remove this similarity and allow damping curves to reflect what is required to achieve best performances for ride quality and handling. By integrating the design within the piston and rod assembly, the need for double-wall or external bypass tube assemblies is removed. The design can easily be integrated with existing technology which does not currently make use of this space.

The present position-relative damper assist system and corresponding parts are preferably made of substantially rigid materials, such as metallic materials, hardened polymers, composite materials, polymeric materials (ex. seals, etc.), and/or the like, so as to ensure a proper operation thereof depending on the particular applications for which the position-relative damper assist system is intended and the different parameters (forces, moments, etc.) in cause, as apparent to a person skilled in the art.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing from the scope and spirit of the present invention, as defined in the appended claims and as apparent to a person skilled in the art.

The invention claimed is:

1. A position-relative damper assist system (1) for use with a vehicle, the position-relative damper assist system (1) comprising:
   top and bottom mounting components (5,3) cooperating with one another to define a corresponding stroke distance (7) between them, and being operable with respect to one another between compression and extension modes along said stroke distance, the top mounting component (5) being operatively connectable to a frame of the vehicle, and the bottom mounting component (3) being operatively connectable to a supporting component of the vehicle;
   a piston assembly (9) being operatively disposed between the top and bottom mounting components (5,3), the piston assembly (9) having a piston head (11) being displaceable within a chamber (13) defined about a portion of one of the top and bottom mounting components (5,3), the piston head (11) being provided with at least one fluid passage (15) for allowing fluid (17) of the chamber (13) to travel from one side of the chamber (13) to another side of the chamber (13) via the piston head (11) of the piston assembly (9), in order to provide a corresponding damping effect;
   an adjustment assembly (19) cooperating with the piston head (11) of the piston assembly (9) for adjustably varying an effective cross-sectional profile of the at least one fluid passage (15) in order to in turn vary a corresponding flow rate of fluid (17) passing through said at least one fluid passage (15), and in turn vary the resulting damping effect; and
   a biasing assembly (21) cooperating with the adjustment assembly (19) for selectively varying a configuration of the adjustment assembly (19) in response to a given input indicative of the positioning of the piston assembly (9) within the stroke distance (7), in order in vary the resulting damping effect in response to a corresponding displacement-profile (23) provided by the biasing assembly (21);
   wherein the piston assembly (9) comprises a piston rod (77) operatively extending between the bottom mounting component (3) of the position-relative damper assist system (1) and the piston head (11) of the piston assembly (9);
   wherein the piston head (11) is removably mountable onto the piston rod (77);
   wherein the piston head (11) is removably mountable onto the piston rod (77) via threading;
   wherein the piston head (11) comprises a mounting collar (79) extending from a bottom surface (11*b*) of the piston head (11), the mounting collar (79) being configured for securing onto the piston rod (77);
   wherein the piston rod (77) comprises a hollow section being provided an internal accumulator (49*a*) having a floating piston head (81); and
   wherein the floating piston head (81) has a cross-sectional shape being complementary to that of an adjacent separator component (47), for allowing the floating piston head (81) to travel within a greater range for a same given length of the internal accumulator (49*a*).

2. A position-relative damper assist system (1) according to claim 1, wherein the at least one fluid passage (15) of the piston head (11) comprises at least one active jounce fluid passage (15*a*) for allowing fluid (17) of the chamber (13) to travel from one side of the chamber (13) to another side of the chamber via the piston head (11) of the piston assembly (9) during the compression mode, and wherein the adjustment assembly (19) comprises a jounce adjustment component (19*a*) being configured for adjustably varying an effective cross-sectional profile of the at least one active jounce fluid passage (15*a*) in order to in turn vary a corresponding flow rate of fluid (17) passing through said at least one active jounce fluid passage (15*a*) during the compression mode.

3. A position-relative damper assist system (1) according to claim 2, wherein the jounce adjustment component (19a) is a spring-loaded jounce adjustment component (19a), and wherein the adjustment assembly (19) thus comprises a corresponding spring (25) having one extremity operatively abutting against a given supporting component (27), and having another extremity operatively pushing against the jounce adjustment component (19a) for urging the jounce adjustment component (19a) into a given default configuration, the spring-loaded jounce adjustment component (19a) being adjustably operable via the biasing assembly (21) between variable opened and closed configurations, wherein in a fully-opened configuration, the jounce adjustment component (19a) is substantially clear from the at least one active jounce fluid passage (15a) in order to allow a maximal passage of fluid (17) through the at least one active jounce fluid passage (15a), and wherein in a fully-closed configuration, the jounce adjustment component (19a) substantially blocks the at least one active jounce fluid passage (15a) in order to allow a minimal passage of fluid (17) through the at least one active jounce fluid passage (15a);

wherein the jounce adjustment component (19a) is positioned, shaped and sized with respect to the at least one active jounce fluid passage (15a) so that the default configuration of the jounce adjustment component (19a) corresponds to the fully-opened configuration of the jounce adjustment component (19a);

wherein the jounce adjustment component (19a) is positioned, shaped and sized with respect to the at least one active jounce fluid passage (15a) so that the default configuration of the jounce adjustment component (19a) corresponds to the fully-closed configuration of the jounce adjustment component (19a);

wherein the piston head (11) of the piston assembly (9) comprises a jounce lodging passage (29a) being positioned, shaped and sized for receiving the jounce adjustment component (19a), the jounce lodging passage (29a) being further positioned, shaped and sized for fluidly intersecting the at least one active jounce fluid passage (15a);

wherein the at least one active jounce fluid passage (15a) extends longitudinally along the piston head (11), and wherein the jounce lodging passage (29a) extends transversally with respect to the piston head (11); and wherein the jounce adjustment component (19a) comprises a shouldering portion (31a) for resting against a corresponding abutment portion (33a) of the jounce lodging passage (29a) when the jounce adjustment component (19a) is in the default configuration.

4. A position-relative damper assist system (1) according to claim 2, wherein the jounce adjustment component (19a) is configured for adjustably moving in response to the input indicative of the positioning of the piston assembly (9) within the stroke distance (7) being received from the biasing assembly (21).

5. A position-relative damper assist system (1) according to claim 2, wherein the biasing assembly (21) includes a biasing component (35) provided with a jounce displacement-profile surface (35a) interacting with the jounce adjustment component (19a) for adjustably moving the jounce adjustment component (19a) with respect to the at least one active jounce fluid passage (15a).

6. A position-relative damper assist system (1) according to claim 5, wherein the chamber (13) containing the piston head (11) of the piston assembly (9) is defined about a portion of the top mounting component (5), and wherein the biasing component (35) with corresponding jounce displacement-profile surface (35a) is mounted onto the top mounting component (5) and is disposed along the chamber (13) of said top mounting component (5);

wherein the biasing component (35) includes a profiled bar (37) being provided with the jounce displacement-profile surface (35a);

wherein the profiled bar (37) is removably and pivotably mountable onto the top mounting component (5) via an attachment component (59);

wherein the profiled bar (37) is disposed centrally within the chamber (13) of the top mounting component (5);

wherein the piston head (11) comprises a corresponding central hole (39) for receiving therethrough the profiled bar (37) of the biasing assembly (21) during a relative displacement of the bottom mounting component (3) with respect to the top mounting component (5);

wherein the piston head (11) further comprises an interlocking component (41) disposed about the corresponding central hole (39) for interlocking with the profiled bar (37) during displacement of the profiled bar (37) through said corresponding central hole (39);

wherein the interlocking component (41) includes a pin (41a) being removably mountable onto the piston head (11) via a fastener (43), the pin (41a) being positioned, shaped and sized for extending within the corresponding central hole (39) and for further fitting into a corresponding slot (41b) disposed about the profiled bar (37);

wherein the pin (41a) is removably insertable into a corresponding receiving passage (85) defined about the piston head (11);

wherein the receiving passage (85) is disposed transversally with respect to the piston head (11);

wherein the receiving passage extends from the central hole (39) of the piston head (11) to a side surface (11c) of the piston head (11);

wherein the fastener (43) is positioned, shaped and sized so that a top portion thereof is lodged within a corresponding recess (45) of the piston head (11) of the piston assembly (9), so as to prevent the top portion of the fastener (43) from exceeding beyond a top surface (11a) of said piston head (11);

wherein the position-relative damper assist system (1) comprises a hollow separator component (47) being removably mountable onto the piston head (11), for use with an internal accumulator (49a), the hollow separator component (47) having an opened end operatively connectable to the corresponding central hole (39) of the piston head (11), and an opposite closed end for separating a fluid (51) of the internal accumulator (49a) from the fluid (17) of the chamber (13);

wherein the hollow separator component (47) is long enough for receiving the profiled bar (37) when the top and bottom mounting components (5,3) are operated in the compression mode;

wherein the profiled bar (37) is long enough for interacting with the jounce adjustment component (19a) when the top and bottom mounting components (5,3) are operated in the extension mode;

wherein the jounce adjustment component (19a) includes a spring-loaded plunger (53) having one end interacting with the jounce displacement-profile surface (35a) for moving in response to a corresponding contour of said jounce displacement-profile surface (35a);

wherein the jounce adjustment component (19a) includes a spring-loaded poppet (55) provided with an adjacent ball-bearing (57) interacting with the jounce displacement-profile surface (35a) for moving in response to a corresponding contour of said jounce displacement-profile surface (35a);
wherein the poppet (55) comprises a shouldering portion (31a) for resting against a corresponding abutment portion (33a); and
wherein a cross-sectional profile of the ball-bearing (57) is smaller than a cross-sectional profile of the poppet (55).

7. A position-relative damper assist system (1) according to claim 5, wherein the jounce displacement-profile surface (35a) is a curved jounce displacement-profile surface (35a) for providing at least two contact points to a corresponding component being operatively connected to the jounce adjustment component (19a).

8. A position-relative damper assist system (1) according to claim 2, wherein the at least one active jounce fluid passage (15a) comprises a pair of active jounce fluid passages (15a) each for allowing fluid (17) of the chamber (13) to travel from one side of the chamber (13) to another side of the chamber via the piston head (11) of the piston assembly (9) during the compression mode, and wherein the jounce adjustment component (19a) is configured for adjustably varying an effective cross-sectional profile of both active jounce fluid passages (15a) in order to in turn vary a corresponding flow rate of fluid (17) passing through the pair of active jounce fluid passages (15a) during the compression mode.

9. A position-relative damper assist system (1) according to claim 2, wherein one end of the at least one active jounce fluid passage (15a) is provided with a corresponding jounce shim assembly (61a) being configured for shimming fluid exiting said end of the at least one active jounce fluid passage (15a) during the compression mode;
wherein the jounce shim assembly (61a) is further configured for preventing fluid from entering said end of the at least one active jounce fluid passage (15a) during the extension mode;
wherein the jounce shim assembly (61a) includes a series of lamellae (63) being stackable onto one another;
wherein the series of lamellae (63) are nestable within a corresponding recess (65) defined about the piston head (11) of the piston assembly (9);
wherein the series of lamellae (63) are securable onto the piston head (11) via at least one fastener (67);
wherein the at least one fastener (67) is positioned, shaped and sized so that a top portion thereof is prevented from exceeding beyond a top surface (11a) of the piston head (11) of the piston assembly (9);
wherein the at least one fastener (67) includes a pair of fasteners (67) configured for threaded engagement into the series of lamellae (63) and piston head (11);
wherein the series of lamellae (63) include a plurality of oblong lamellae (63) of different lengths, with a longest lamella (63) being positioned at a bottommost portion of the series of lamellae (63) and a shortest lamella (63) being positioned at an upper portion of the series of lamellae (63); and
wherein each lamella (63) of the series of lamellae (63) is shorter than a preceding bottom lamella (63).

10. A position-relative damper assist system (1) according to claim 1, wherein the at least one fluid passage (15) of the piston head (11) comprises at least one active rebound fluid passage (15b) for allowing fluid (17) of the chamber (13) to travel from one side of the chamber (13) to another side of the chamber (13) via the piston head (11) of the piston assembly (9) during the extension mode, and wherein the adjustment assembly (19) comprises a rebound adjustment component (19b) being configured for adjustably varying an effective cross-sectional profile of the at least one active rebound fluid passage (15b) in order to in turn vary a corresponding flow rate of fluid (17) passing through said at least one active rebound fluid passage (15b) during the extension mode.

11. A position-relative damper assist system (1) according to claim 10, wherein the rebound adjustment component (19b) is a spring-loaded rebound adjustment component (19b), and wherein the adjustment assembly (19) thus comprises a corresponding spring (25) having one extremity operatively abutting against a given supporting component (27), and having another extremity operatively pushing against the rebound adjustment component (19b) for urging the rebound adjustment component (19b) into a given default configuration, the spring-loaded rebound adjustment component (19b) being adjustably operable via the biasing assembly (21) between variable opened and closed configurations, wherein in a fully-opened configuration, the rebound adjustment component (19b) is substantially clear from the at least one active rebound fluid passage (15b) in order to allow a maximal passage of fluid (17) through the at least one active rebound fluid passage (15b), and wherein in a fully-closed configuration, the rebound adjustment component (19b) substantially blocks the at least one active rebound fluid passage (15b) in order to allow a minimal passage of fluid (17) through the at least one active rebound fluid passage (15b);
wherein the rebound adjustment component (19b) is positioned, shaped and sized with respect to the at least one active rebound fluid passage (15b) so that the default configuration of the rebound adjustment component (19b) corresponds to the fully-opened configuration of the rebound adjustment component (19b);
wherein the rebound adjustment component (19b) is positioned, shaped and sized with respect to the at least one active rebound fluid passage (15b) so that the default configuration of the rebound adjustment component (19b) corresponds to the fully-closed configuration of the rebound adjustment component (19b);
wherein the piston head (11) of the piston assembly (9) comprises a rebound lodging passage (29b) being positioned, shaped and sized for receiving the rebound adjustment component (19b), the rebound lodging passage (29b) being further positioned, shaped and sized for fluidly intersecting the at least one active rebound fluid passage (15b);
wherein the at least one active rebound fluid passage (15b) extends longitudinally along the piston head (11), and wherein the rebound lodging passage (29b) extends transversally with respect to the piston head (11);
wherein the rebound adjustment component (19b) comprises a shouldering portion (31b) for resting against a corresponding abutment portion (33b) of the rebound lodging passage (29b) when the rebound adjustment component (19b) is in the default configuration;
wherein the rebound adjustment component (19b) is configured for adjustably moving in response to the input indicative of the positioning of the piston assembly (9) within the stroke distance (7) being received from the biasing assembly (21);
wherein the biasing component (35) is further provided with a rebound displacement-profile surface (35b) interacting with the rebound adjustment component (19b) for adjustably moving the rebound adjustment component (19b) with respect to the at least one active rebound fluid passage (15b);

wherein the biasing component (35) with corresponding rebound displacement-profile surface (35b) is mounted onto the top mounting component (5) and is disposed along the chamber of said top mounting component (5);

wherein a profiled bar (37) is further provided with the rebound displacement-profile surface (35b);

wherein the profiled bar (37) is long enough for interacting with the rebound adjustment component (19b) when the top and bottom mounting components (5,3) are operated in the extension mode;

wherein the rebound adjustment component (19b) includes a spring-loaded plunger (53) having one end interacting with the rebound displacement-profile surface (35b) for moving in response to a corresponding contour of said rebound displacement-profile surface (35b);

wherein the rebound adjustment component (19b) includes a spring-loaded poppet (55) provided with an adjacent ball-bearing (57) interacting with the rebound displacement-profile surface (35b) for moving in response to a corresponding contour of said rebound displacement-profile surface (35b);

wherein the poppet (55) comprises a shouldering portion (31b) for resting against a corresponding abutment portion (33b);

wherein a cross-sectional profile of the ball-bearing (57) is smaller than a cross-sectional profile of the poppet (55);

wherein the rebound displacement-profile surface (35b) is a curved rebound displacement-profile surface (35b) for providing at least two contact points to a corresponding component being operatively connected to the rebound adjustment component (19b);

wherein the at least one active rebound fluid passage (15b) comprises a pair of active rebound fluid passages (15b) each for allowing fluid (17) of the chamber (13) to travel
from one side of the chamber (13) to another side of the chamber (13) via the piston head (11) of the piston assembly (9) during the extension mode, and wherein the rebound adjustment component (19b) is configured for adjustably varying an effective cross-sectional profile of both active rebound fluid passages (15b) in order to in turn vary a corresponding flow rate of fluid (17) passing through the pair of active rebound fluid passages (15b) during the extension mode;

wherein one end of the at least one active rebound fluid passage (15b) is provided with a corresponding rebound shim assembly (61b) being configured for shimming fluid (17) exiting said end of the at least one active rebound fluid passage (15b) during the extension mode;

wherein the rebound shim assembly (61b) is further configured for preventing fluid (17) from entering said end of the at least one active rebound fluid passage (15b) during the compression mode;

wherein the rebound shim assembly (61b) includes a series of lamellae (63) being stackable onto one another;

wherein the series of lamellae (63) are nestable within a corresponding recess (65) defined about the piston head (11) of the piston assembly (9);

wherein the series of lamellae (63) are securable onto the piston head (11) via at least one fastener (67);

wherein the at least one fastener (67) is positioned, shaped and sized so that a top portion thereof is prevented from exceeding beyond a top surface (11a) of the piston head (11) of the piston assembly (9);

wherein the at least one fastener (67) includes a pair of fasteners (67) configured for threaded engagement into the series of lamellae (63) and piston head (11);

wherein the series of lamellae (63) includes a plurality of oblong lamellae (63) of different lengths, with a longest lamella (63) being positioned at a bottommost portion of the series of lamellae (63) and a shortest lamella (63) being positioned at an upper portion of the series of lamellae (63);

wherein each lamella (63) of the series of lamellae (63) is shorter than a preceding bottom lamella (63);

wherein the at least one active jounce fluid passage (15a) and corresponding jounce adjustment component (19a) are disposed on one side of the piston head (11), and wherein the at least one active rebound fluid passage (15b) and corresponding rebound adjustment component (19b) are disposed on another opposite side of the piston head (11);

wherein a jounce lodging passage (29a) and the rebound lodging passage (29b) are fluidly connected to one another; and wherein the jounce lodging passage (29a) and the rebound lodging passage (29b) are further fluidly connected to the corresponding central hole (39) of the piston head (11).

12. A position-relative damper assist system (1) according to claim 1, wherein the at least one fluid passage (15) of the piston head (11) comprises at least one passive fluid passage (15c) for allowing fluid (17) of the chamber (13) to travel from one side of the chamber (13) to another side of the chamber via the piston head (11) of the piston assembly (9) during either one of the compression and extension modes;

wherein the at least one fluid passage (15) of the piston head (11) comprises a pair of passive fluid passages (15c) for allowing fluid (17) of the chamber (13) to travel from one side of the chamber (13) to another side of the chamber (13) via the piston head (11) of the piston assembly (9) during either one of the compression and extension modes;

wherein the at least one fluid passage (15) of the piston head (11) includes at least one fluid passage (15) being internal to the piston head (11) of the piston assembly (9); and wherein the at least one fluid passage (15) of the piston head (11) includes at least one fluid passage (15) being external to the piston head (11) of the piston assembly (9).

13. A position-relative damper assist system (1) according to claim 1, wherein at least one of the top and bottom mounting components (5,3) is provided with an eyelet (69);

wherein the top and bottom mounting components (5,3) are each provided with an eyelet (69), and wherein the stroke distance (7) of the top and bottom mounting components (5,3) corresponds to an eyelet-to-eyelet distance; and wherein each eyelet (69) is provided with a corresponding bearing (71).

14. A position-relative damper assist system (1) according to claim 1, wherein the position-relative damper assist system (1) comprises an outer-seal end cap (73) for sealingly closing an interface between the top and bottom mounting components (5,3).

15. A position-relative damper assist system (1) according to claim 1, wherein the chamber (13) is operatively connected to at least one corresponding port (75) selected from the group consisting of bleed port (75a) and fill port (75b).

16. A position-relative damper assist system (1) according to claim 1, wherein the position-relative damper assist system (1) comprises an external accumulator (49b) configured for cooperating with the piston assembly (9);
   wherein the position-relative damper assist system (1) comprises a shock-absorbing spring (83) interacting between the bottom and top mounting components (3,5); and
   wherein the shock-absorbing spring (83) is a coil spring having one end operatively secured to the top mounting component (5) and another end operatively secured to the bottom mounting component (3).

17. A vehicle with a suspension assembly provided with at least one position-relative damper assist system according to claim 1, said at least one position-relative damper system being operatively provided about a front or a rear supporting component of the vehicle.

18. A kit with components for assembling a position-relative damper assist system (1) according to claim 1.

19. A position-relative damper assist system (1) for use with a vehicle, the position-relative damper assist system (1) comprising:
   top and bottom mounting components (5,3) cooperating with one another to define a corresponding stroke distance (7) between them, and being operable with respect to one another between compression and extension modes along said stroke distance, the top mounting component (5) being operatively connectable to a frame of the vehicle, and the bottom mounting component (3) being operatively connectable to a supporting component of the vehicle;
   a piston assembly (9) being operatively disposed between the top and bottom mounting components (5,3), the piston assembly (9) having a piston head (11) being displaceable within a chamber (13) defined about a portion of one of the top and bottom mounting components (5,3), the piston head (11) being provided with at least one fluid passage (15) for allowing fluid (17) of the chamber (13) to travel from one side of the chamber (13) to another side of the chamber (13) via the piston head (11) of the piston assembly (9), in order to provide a corresponding damping effect;
   an adjustment assembly (19) cooperating with the piston head (11) of the piston assembly (9) for adjustably varying an effective cross-sectional profile of the at least one fluid passage (15) in order to in turn vary a corresponding flow rate of fluid (17) passing through said at least one fluid passage (15), and in turn vary the resulting damping effect; and
   a biasing assembly (21) cooperating with the adjustment assembly (19) for selectively varying a configuration of the adjustment assembly (19) in response to a given input indicative of the positioning of the piston assembly (9) within the stroke distance (7), in order in vary the resulting damping effect in response to a corresponding displacement-profile (23) provided by the biasing assembly (21);
   wherein the at least one fluid passage (15) of the piston head (11) comprises at least one active jounce fluid passage (15a) for allowing fluid (17) of the chamber (13) to travel from one side of the chamber (13) to another side of the chamber via the piston head (11) of the piston assembly (9) during the compression mode, and wherein the adjustment assembly (19) comprises a jounce adjustment component (19a) being configured for adjustably varying an effective cross-sectional profile of the at least one active jounce fluid passage (15a) in order to in turn vary a corresponding flow rate of fluid (17) passing through said at least one active jounce fluid passage (15a) during the compression mode;
   wherein the at least one fluid passage (15) of the piston head (11) comprises at least one passive fluid passage (15c) for allowing fluid (17) of the chamber (13) to travel from one side of the chamber (13) to another side of the chamber via the piston head (11) of the piston assembly (9) during either one of the compression and extension modes;
   wherein the at least one fluid passage (15) of the piston head (11) comprises a pair of passive fluid passages (15c) for allowing fluid (17) of the chamber (13) to travel from one side of the chamber (13) to another side of the chamber (13) via the piston head (11) of the piston assembly (9) during either one of the compression and extension modes;
   wherein the at least one fluid passage (15) of the piston head (11) includes at least one fluid passage (15) being internal to the piston head (11) of the piston assembly (9); and
   wherein the at least one fluid passage (15) of the piston head (11) includes at least one fluid passage (15) being external to the piston head (11) of the piston assembly (9).

* * * * *